(12) United States Patent
Kusashima

(10) Patent No.: US 10,880,892 B2
(45) Date of Patent: Dec. 29, 2020

(54) COMMUNICATION DEVICE, COMMUNICATION METHOD, AND PROGRAM FOR SELECTIVELY SWITCHING BETWEEN A FIRST PHYSICAL UPLINK CHANNEL AND A SECOND PHYSICAL UPLINK CHANNEL

(71) Applicant: Sony Corporation, Tokyo (JP)

(72) Inventor: Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/322,128

(22) PCT Filed: Jun. 21, 2017

(86) PCT No.: PCT/JP2017/022765
§ 371 (c)(1),
(2) Date: Jan. 31, 2019

(87) PCT Pub. No.: WO2018/029993
PCT Pub. Date: Feb. 15, 2018

(65) Prior Publication Data
US 2019/0191437 A1 Jun. 20, 2019

(30) Foreign Application Priority Data
Aug. 8, 2016 (JP) ................................ 2016-155685

(51) Int. Cl.
*H04W 72/04* (2009.01)
*H04W 72/12* (2009.01)
(Continued)

(52) U.S. Cl.
CPC ....... *H04W 72/0453* (2013.01); *H04L 1/0063* (2013.01); *H04L 5/0007* (2013.01);
(Continued)

(58) Field of Classification Search
None
See application file for complete search history.

(56) References Cited

U.S. PATENT DOCUMENTS

2010/0215373 A1* 8/2010 Iwamura ............. H04J 13/0003
398/98
2012/0057449 A1* 3/2012 Takaoka ................. H04B 1/713
370/210
(Continued)

OTHER PUBLICATIONS

Intel Corporation: "Summary on Remaining Issues on Narrowband Retuning for eMTC", RI-161255, (3GPP), vol. RAN WG1, Feb. 15, 2016-Feb. 19, 2016 Feb. 24, 2016 (Feb. 24, 2016), XP051079188, Retrieved from the Internet: URL:http://www.3gpp.org/ftp/tsg_ran/WG1_RL1/TSGR1_84/Docs.
(Continued)

*Primary Examiner* — Anh Ngoc M Nguyen
(74) *Attorney, Agent, or Firm* — Xsensus, LLP

(57) ABSTRACT

[Object] To enable multiplexing configurations of a plurality of uplink control channels in a preferred mode in a communication system in which a base station device and a terminal device communicate with each other. [Solution] A communication device includes: a communication unit configured to perform wireless communication; and a control unit configured to selectively switch between a first physical channel and a second physical channel in which both conditions of the number of symbols and the number of resource blocks are different from each other and which are allocated during a predetermined period in a time direction to transmit control information to a base station.

25 Claims, 24 Drawing Sheets

(51) Int. Cl.
- H04L 5/00 (2006.01)
- H04W 76/15 (2018.01)
- H04W 76/11 (2018.01)
- H04W 76/27 (2018.01)
- H04L 1/00 (2006.01)
- H04W 80/02 (2009.01)

(52) U.S. Cl.
CPC .......... *H04L 5/0053* (2013.01); *H04L 5/0055* (2013.01); *H04W 72/04* (2013.01); *H04W 72/042* (2013.01); *H04W 72/0446* (2013.01); *H04W 72/12* (2013.01); *H04W 72/1205* (2013.01); *H04W 76/11* (2018.02); *H04W 76/15* (2018.02); *H04W 76/27* (2018.02); *H04W 80/02* (2013.01); *H04L 5/0078* (2013.01)

(56) References Cited

U.S. PATENT DOCUMENTS

| | | | | |
|---|---|---|---|---|
| 2013/0077522 | A1* | 3/2013 | Iyama | H04W 52/225 370/252 |
| 2014/0307571 | A1* | 10/2014 | Herzen | H04W 24/02 370/252 |
| 2015/0296523 | A1* | 10/2015 | Joshi | H04W 72/082 455/426.1 |
| 2016/0066361 | A1* | 3/2016 | Ogawa | H04W 72/0453 370/315 |
| 2016/0165547 | A1 | 6/2016 | Ouchi et al. | |
| 2016/0174233 | A1* | 6/2016 | Emmanuel | H04W 24/08 370/252 |
| 2016/0183076 | A1* | 6/2016 | Bagayoko | H04W 72/04 370/329 |
| 2017/0048812 | A1* | 2/2017 | Da | H04W 56/004 |

OTHER PUBLICATIONS

Extended European Search Report issued August 27, 2019 in European Application No. 17839067.0-1219.

3GPP, "Technical Specification Group Radio Access Network; Study on Scenarios and Requirements for Next Generation Access Technologies", 3GPP TR 38.913 V0.3.0, Release 14, Mar. 2016, pp. 1-30.

LG Electronics, "Discussion on frame structure for NR", 3GPP TSG-RAN WG1 Meeting # 85, R1-164560, Nanjing China, May 23-27, 2016, 8 pages.

Huawei, Hisilicon, "Discussion on frame structure for NR", 3GPP TSG-RAN WG 1 Meeting # 85, R1-164032, Nanjing China, May 23-27, 2016, 8 pages.

International Search Report dated Sep. 5, 2017 for PCT/JP2017/022765 filed on Jun. 21, 2017, 9 pages including English translation.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

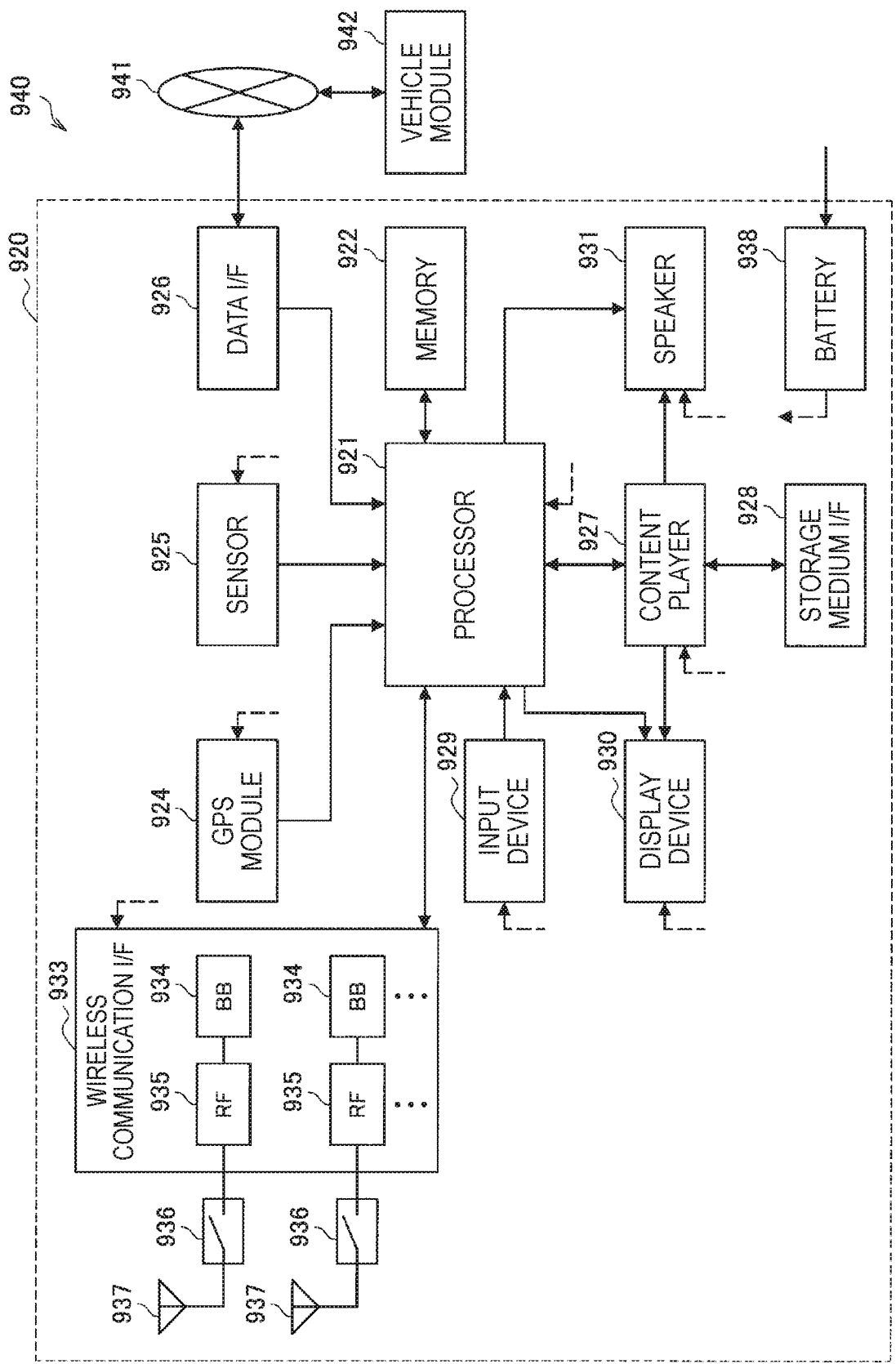

COMMUNICATION DEVICE, COMMUNICATION METHOD, AND PROGRAM FOR SELECTIVELY SWITCHING BETWEEN A FIRST PHYSICAL UPLINK CHANNEL AND A SECOND PHYSICAL UPLINK CHANNEL

CROSS-REFERENCE TO RELATED APPLICATIONS

The present application is based on PCT filing PCT/JP2017/022765, filed Jun. 21, 2017, and claims priority to 2016-155685, filed in the Japanese Patent Office on Aug. 8, 2016, the entire contents of each of which being incorporated herein by reference.

TECHNICAL FIELD

The present disclosure relates to a communication device, a communication method, and a program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0.3.0 (2016-03). <http://www.3gpp.org/ftp//Specs/archive/38_series/38.913/38913-030.zip>

DISCLOSURE OF INVENTION

Technical Problem

In wireless access technologies, it is preferable to flexibly design capabilities of terminal devices such as decoding processes for downlink channels or generation processes for uplink channels in accordance with use cases. From the viewpoint of frequency use efficiency, it is important to perform multiplexing of the plurality of flexibly designed wireless access technologies. Then, in accordance with the capabilities of terminal devices which are communication targets, it is preferable to flexibly switch between configurations of uplink control channels as well. However, it is difficult to multiplex the configurations of the plurality of uplink control channels.

Accordingly, the present disclosure proposes a communication device, a communication method, and a program capable of multiplexing configurations of a plurality of uplink control channels in a preferred mode in a communication system in which a base station device and a terminal device communicate with each other.

Solution to Problem

According to the present disclosure, there is provided a communication device including: a communication unit configured to perform wireless communication; and a control unit configured to selectively switch between a first physical channel and a second physical channel in which both conditions of the number of symbols and the number of resource blocks are different from each other and which are allocated during a predetermined period in a time direction to transmit control information to a base station.

In addition, according to the present disclosure, there is provided a communication device including: a communication unit configured to perform wireless communication; and a notification unit configured to notify a terminal device of information regarding switching between a first physical channel and a second physical channel in which both conditions of the number of symbols and the number of resource blocks are different from each other and which are allocated during a predetermined period in a time direction to receive control information from the terminal device.

In addition, according to the present disclosure, there is provided a communication method including: performing wireless communication; and selectively switching between a first physical channel and a second physical channel in which both conditions of the number of symbols and the number of resource blocks are different from each other and which are allocated during a predetermined period in a time direction to transmit control information to a base station by a computer.

In addition, according to the present disclosure, there is provided a communication method including: performing wireless communication; and notifying a terminal device of information regarding switching between a first physical channel and a second physical channel in which both conditions of the number of symbols and the number of resource blocks are different from each other and which are allocated during a predetermined period in a time direction to receive control information from the terminal device by a computer.

In addition, according to the present disclosure, there is provided a program causing a computer to: perform wireless communication; and selectively switch between a first physical channel and a second physical channel in which both conditions of the number of symbols and the number of resource blocks are different from each other and which are allocated during a predetermined period in a time direction to transmit control information to a base station.

In addition, according to the present disclosure, there is provided a program causing a computer to: perform wireless communication; and notify a terminal device of information regarding switching between a first physical channel and a second physical channel in which both conditions of the number of symbols and the number of resource blocks are different from each other and which are allocated during a predetermined period in a time direction to receive control information from the terminal device.

Advantageous Effects of Invention

According to the present disclosure, as described above, it is possible to provide a communication device, a communication method, and a program capable of multiplexing configurations of a plurality of uplink control channels in a preferred mode in a communication system in which a base station device and a terminal device communicate with each other.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

FIG. 27 is a block diagram illustrating an example of a schematic configuration of a car navigation apparatus.

MODE(S) FOR CARRYING OUT THE INVENTION

Figure 1:
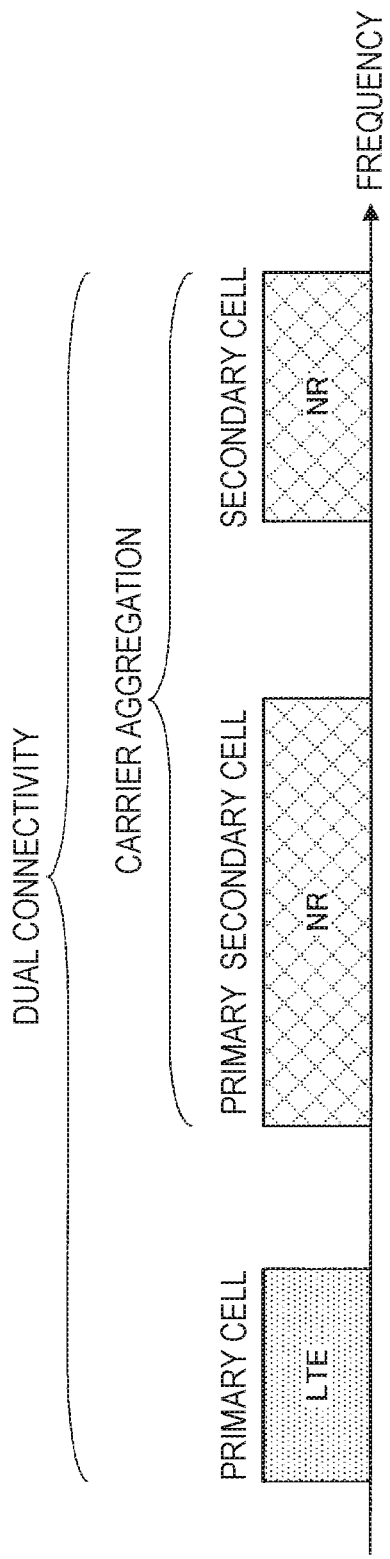
FIG. 1 is a diagram illustrating an example of setting of a component carrier according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Embodiment
1.1. Overview
1.2. Wireless frame configuration
1.3. Channel and signal
1.4. Configuration
1.5. Control information and control channel
1.6. CA and DC
1.7. Resource allocation
1.8. Error correction
1.9. Resource element mapping
1.10 Self-contained transmission
1.11. Technical features
2. Application examples
2.1. Application example related to base station
2.2. Application example related to terminal device
3. Conclusion

1. EMBODIMENT

<1.1. Overview>

Hereinafter. (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. Communication using a set of a plurality of cells or a set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
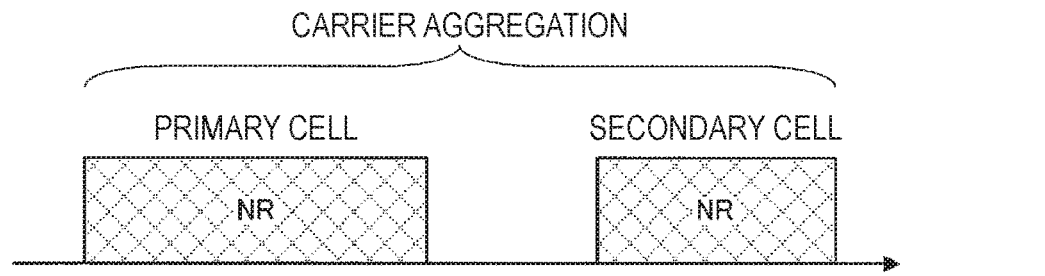
FIG. 2 is a diagram illustrating an example of setting of a component carrier according to the embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<1.2. Radio Frame Configuration>
<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
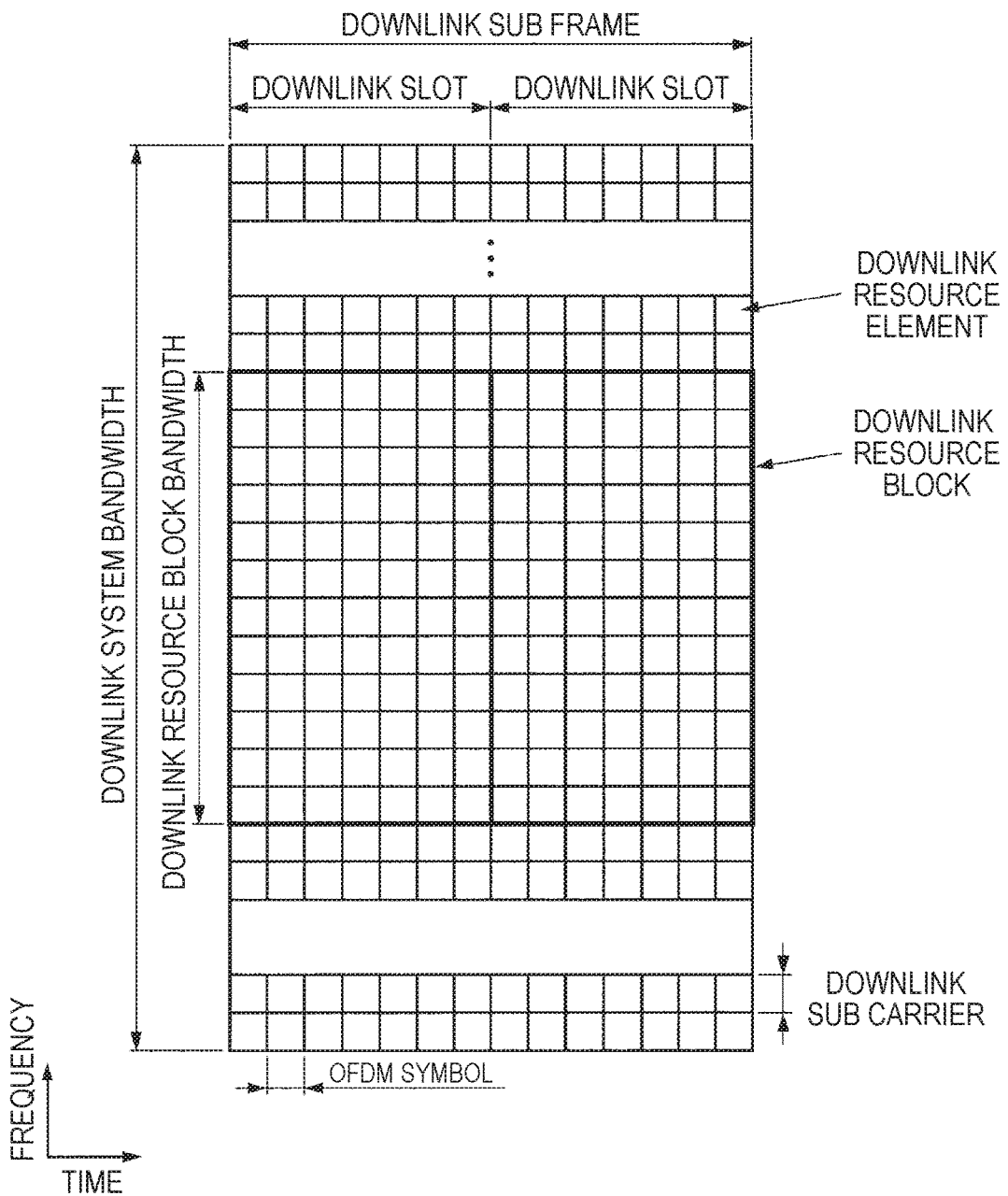
FIG. 3 is a diagram illustrating an example of a downlink sub frame of LTE according to the embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
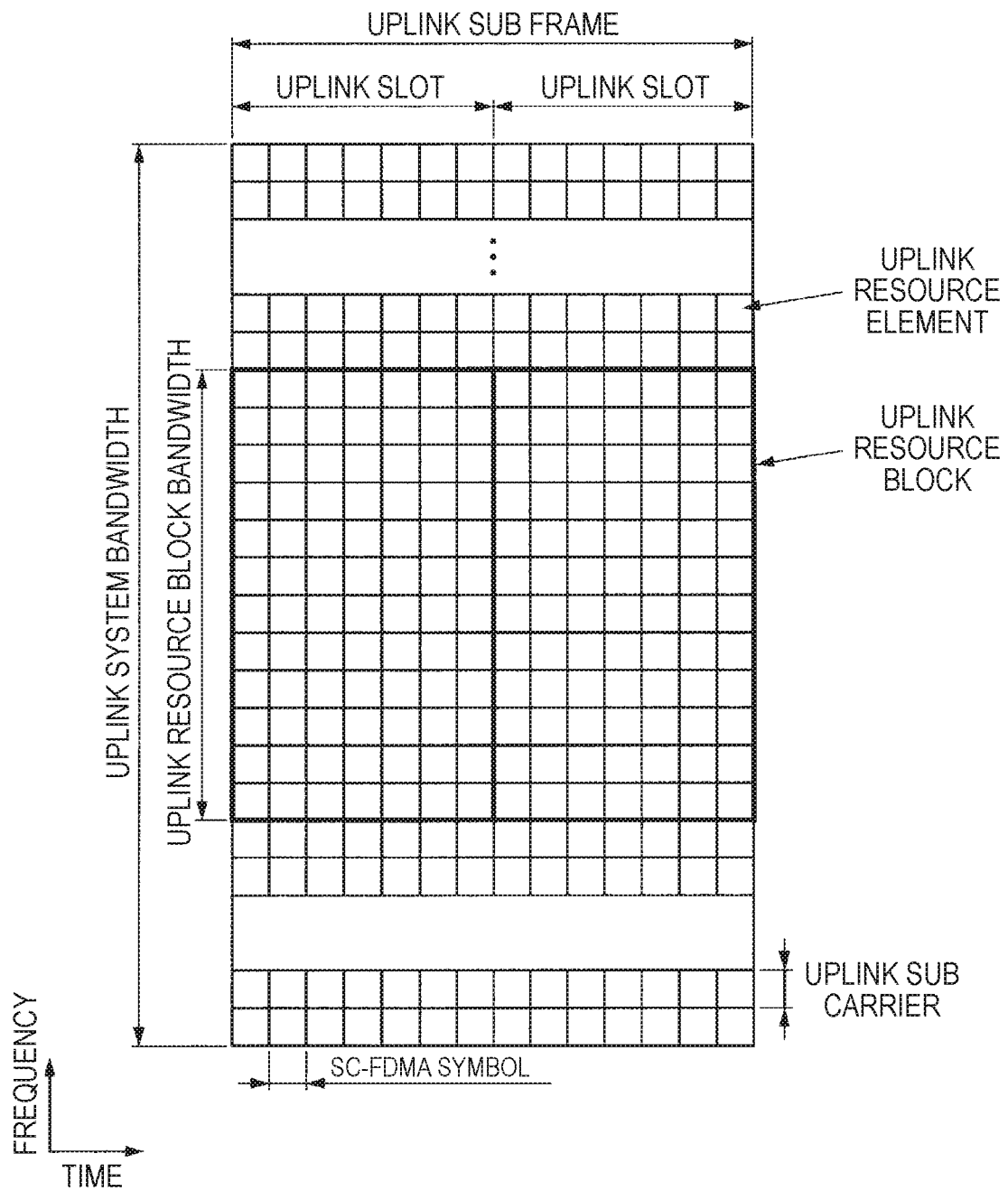
FIG. 4 is a diagram illustrating an example of an uplink sub frame of LTE according to the embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to as simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
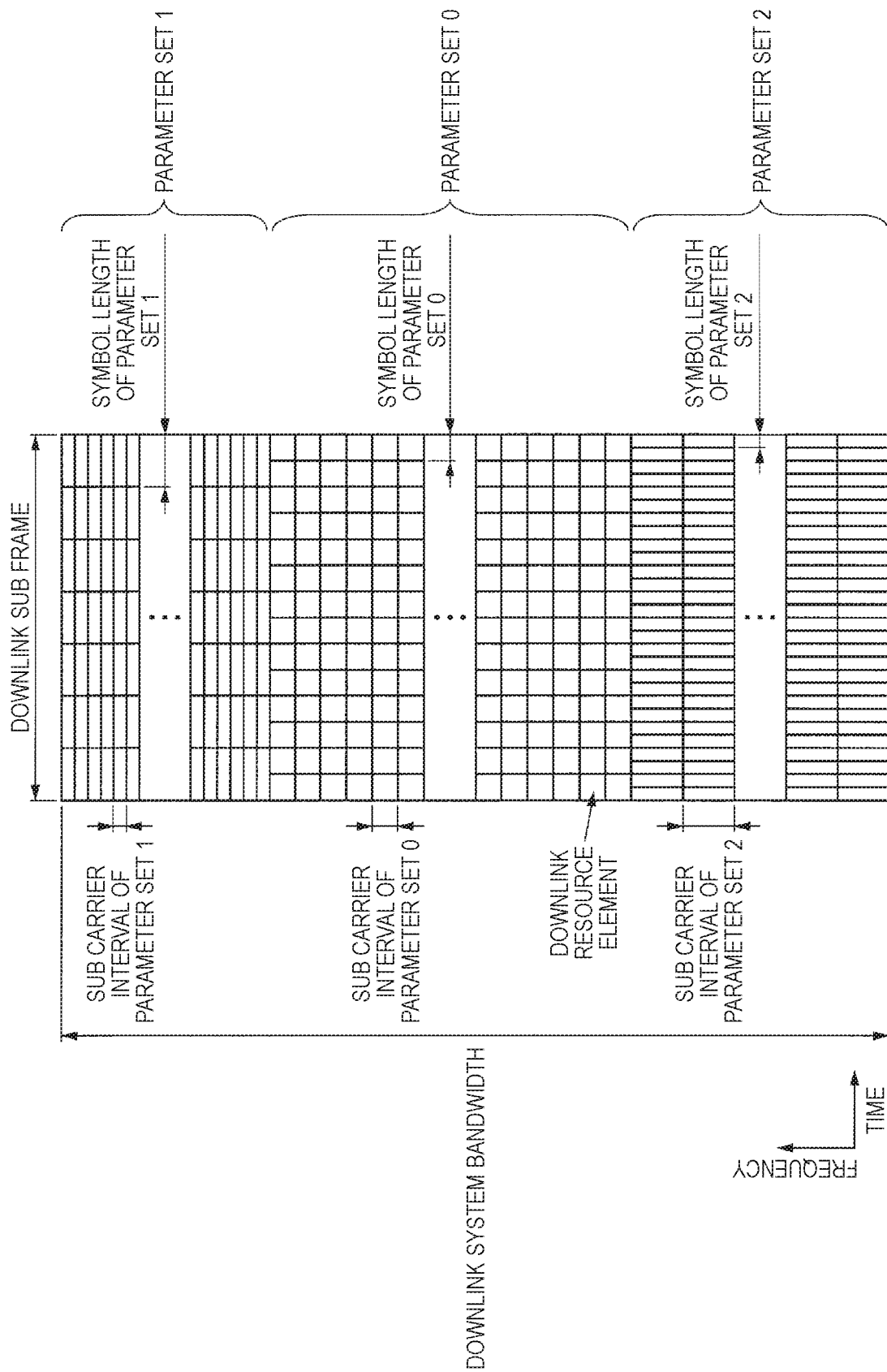
FIG. 6 is a diagram illustrating an example of an NR downlink sub frame of the embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
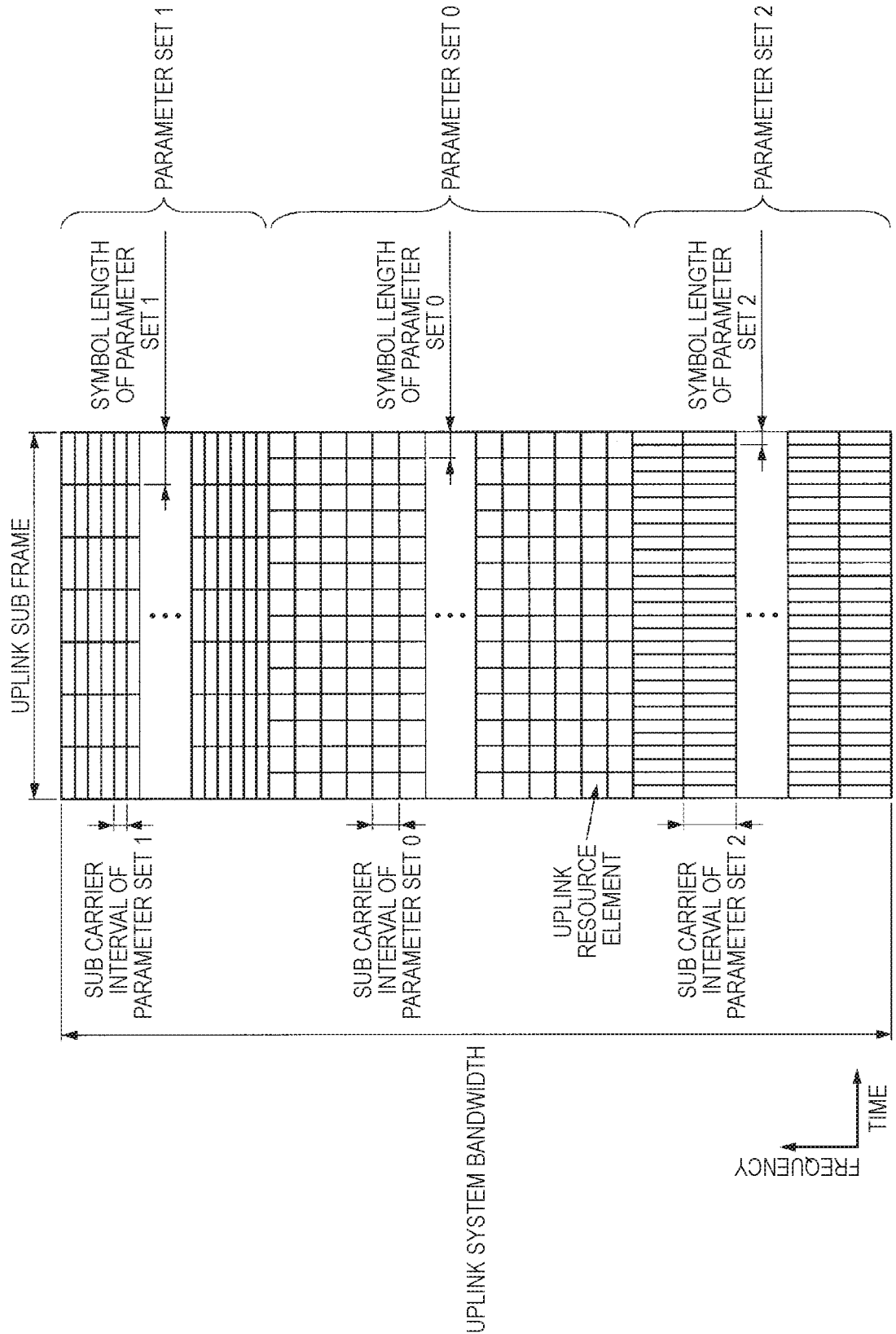
FIG. 7 is a diagram illustrating an example of an NR uplink sub frame of the embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<1.3. Channel and Signal>
<Physical Channel and Physical Signal in Present Embodiment>

In the present embodiment, physical channels and physical signals are used. The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<NR Physical Channel and NR Physical Signal in Present Embodiment>

The description of the physical channel and the physical signal in the LTED can also be applied to the NR physical channel and the NR physical signal, respectively. The NR physical channel and the NR physical signal are referred to as the following.

The NR uplink physical channel includes an NR-PUSCH (Physical Uplink Shared Channel), an NR-PUCCH (Physical Uplink Control Channel), an NR-PRACH (Physical Random Access Channel), and the like.

The NR physical downlink signal includes an NR-SS, an NR-DL-RS, an NR-DS, and the like. The NR-SS includes an NR-PSS, an NR-SSS, and the like.

The NR-RS includes an NR-CRS, an NR-PDSCH-DMRS, an NR-EPDCCH-DMRS, an NR-PRS, an NR-CSI-RS, an NR-TRS, and the like.

The NR physical uplink channel includes an NR-PUSCH, an NR-PUCCH, an NR-PRACH, and the like.

The NR physical uplink signal includes an NR-UL-RS. The NR-UL-RS includes an NR-UL-DMRS, an NR-SRS, and the like.

The NR physical sidelink channel includes an NR-PSBCH, an NR-PSCCH, an NR-PSDCH, an NR-PSSCH, and the like.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PCFICH is used to transmit information related to the number of OFDM symbols used for transmission of the PDCCH. A region indicated by PCFICH is also referred to as a PDCCH region. The information transmitted through the PCFICH is also referred to as a control format indicator (CFI).

The PHICH is used to transmit an HARQ-ACK (an HARQ indicator, HARQ feedback, response information, and HARQ (Hybrid Automatic Repeat request)) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received by the terminal device 2, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS maxy be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACKINACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Physical Resources for Control Channel in Present Embodiment>

A resource element group (REG) is used to define mapping of the resource element and the control channel. For example, the REG is used for mapping of the PDCCH, the PHICH, or the PCFICH. The REG is constituted by four consecutive resource elements which are in the same OFDM symbol and not used for the CRS in the same resource block. Further, the REG is constituted by first to fourth OFDM symbols in a first slot in a certain sub frame.

An enhanced resource element group (EREG) is used to define mapping of the resource elements and the enhanced control channel. For example, the EREG is used for mapping of the EPDCCH. One resource block pair is constituted by 16 EREGs. Each EREG is assigned the number of 0 to 15 for each resource block pair. Each EREG is constituted by 9 resource elements excluding resource elements used for the DM-RS associated with the EPDCCH in one resource block pair.

<1.4. Configuration>

<Configuration Example of Base Station Device 1 in Present Embodiment>

Figure 8:
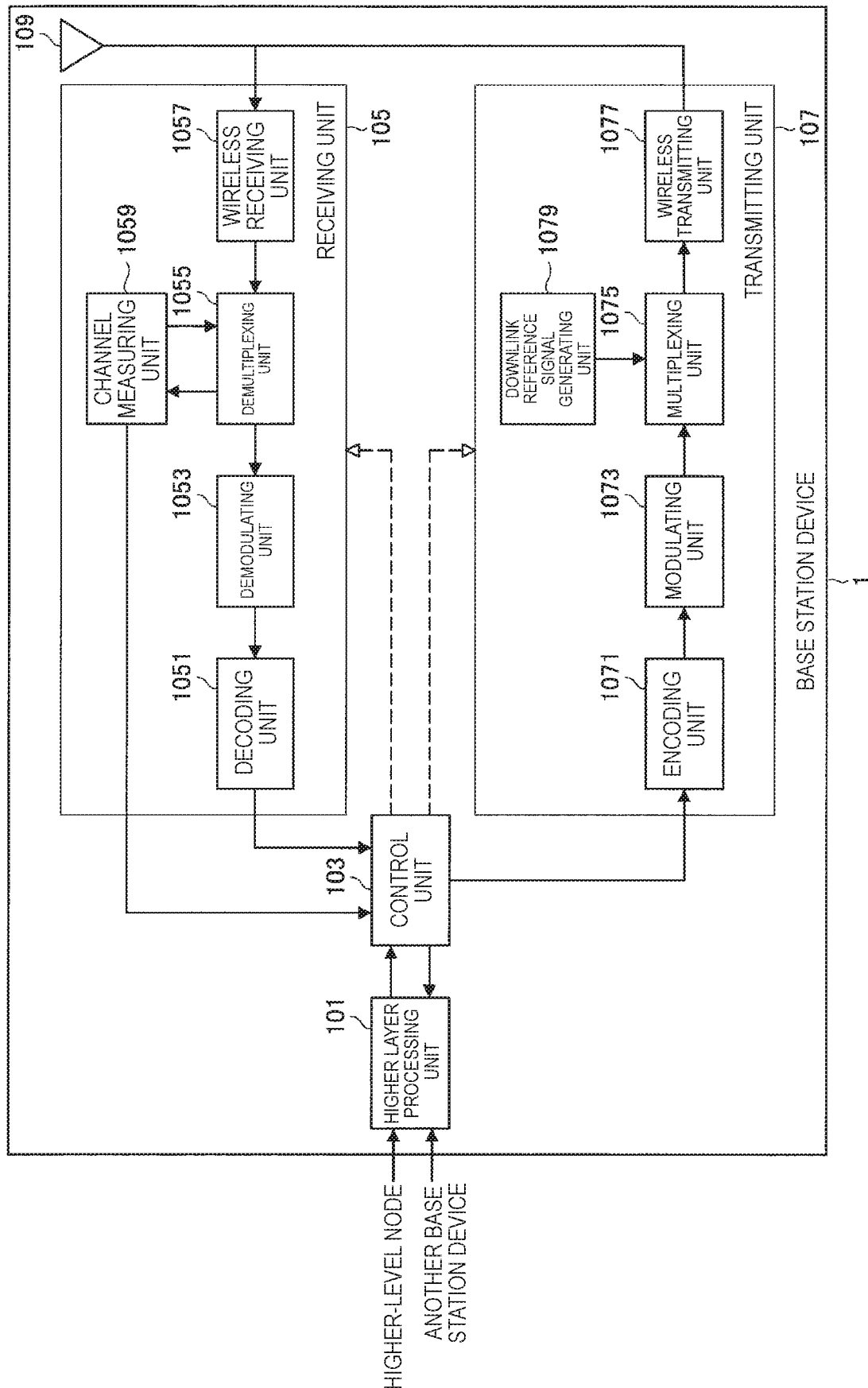
FIG. 8 is a schematic block diagram illustrating a configuration of a base station device of the embodiment.

FIG. 8 is a schematic block diagram illustrating a configuration of the base station device 1 of the present embodiment. As illustrated, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a settings related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Base Station Device 2 in Present Embodiment>

Figure 9:
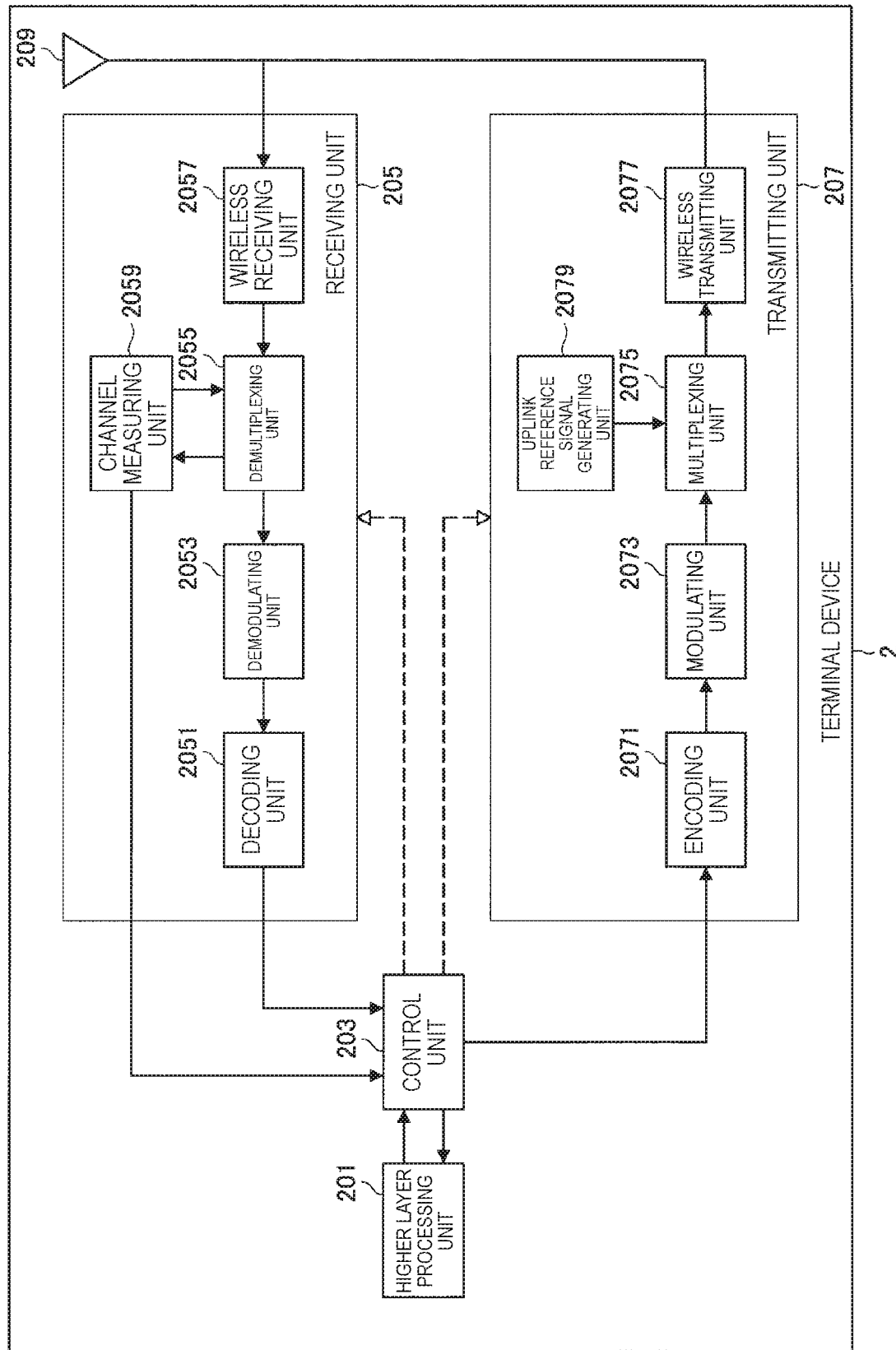
FIG. 9 is a schematic block diagram illustrating a configuration of a terminal device of the embodiment.

FIG. 9 is a schematic block diagram illustrating a configuration of the terminal device 2 of the present embodiment. As illustrated, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK. QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<1.5. Control Information and Control Channel>
<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format IA and the DCI format 1. For example, the terminal device 2 in which a downlink transmission mode 4 is set monitors the DCI format IA and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<1.6. CA and DC>
<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<1.7. Resource Allocation>
<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<1.8. Error Correction>
<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<1.9. Resource Element Mapping>
<Details of LTE Downlink Resource Element Mapping in Present Embodiment>

Figure 10:
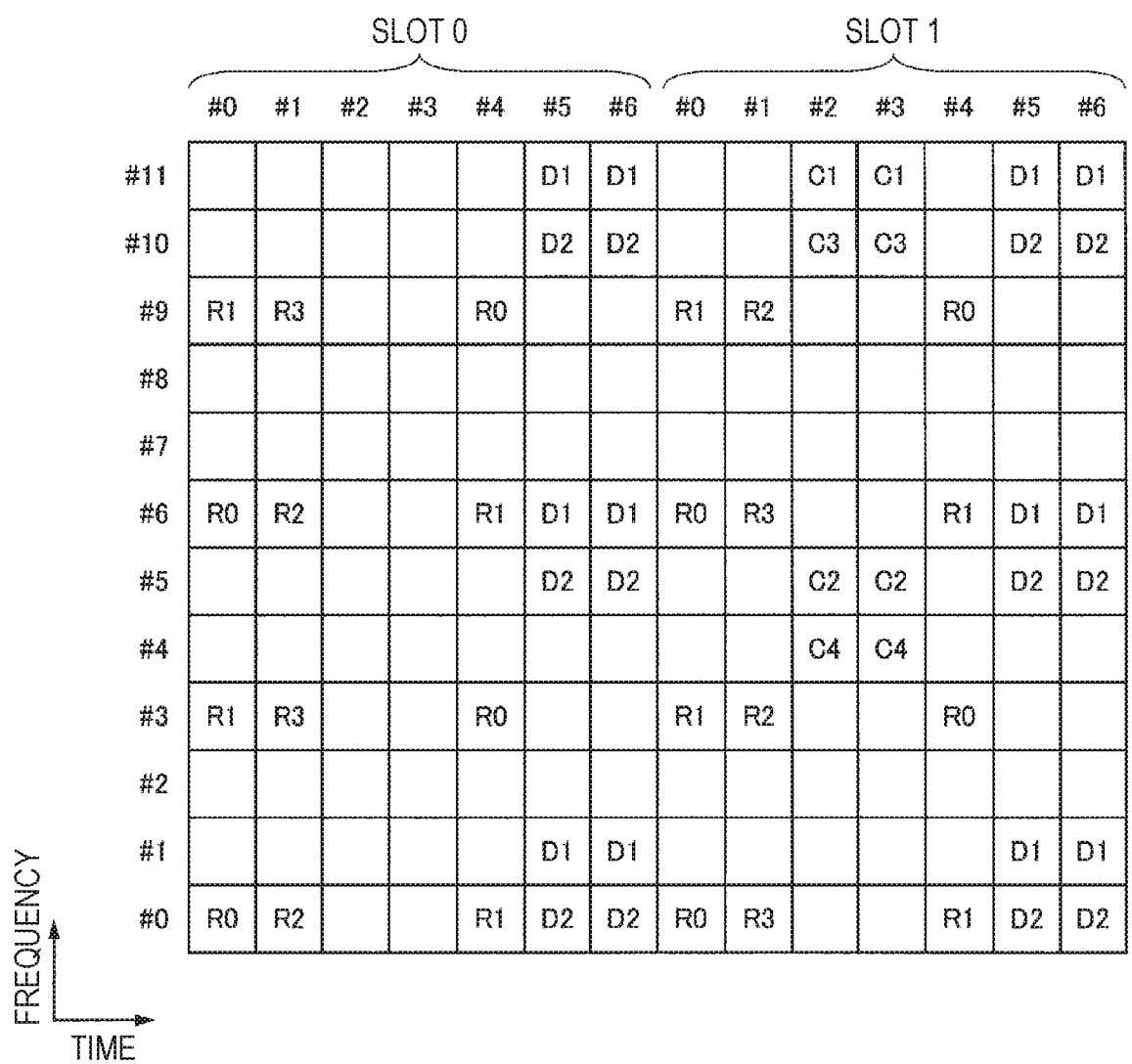
FIG. 10 is a diagram illustrating an example of downlink resource element mapping of LTE according to the embodiment.

FIG. 10 is a diagram illustrating an example of LTE downlink resource element mapping in the present embodiment. In this example, a set of resource elements in one resource block pair in a case in which one resource block and the number of OFDM symbols in one slot are 7 will be described. Further, seven OFDM symbols in a first half in the time direction in the resource block pair are also referred to as a slot 0 (a first slot). Seven OFDM symbols in a second half in the time direction in the resource block pair are also referred to as a slot 1 (a second slot). Further, the OFDM symbols in each slot (resource block) are indicated by OFDM symbol number 0 to 6. Further, the sub carriers in the frequency direction in the resource block pair are indicated by sub carrier numbers 0 to 11. Further, in a case in which a system bandwidth is constituted by a plurality of resource blocks, a different sub carrier number is allocated over the system bandwidth. For example, in a case in which the system bandwidth is constituted by six resource blocks, the sub carriers to which the sub carrier numbers 0 to 71 are allocated are used. Further, in the description of the present embodiment, a resource element (k, l) is a resource element indicated by a sub carrier number k and an OFDM symbol number 1.

Resource elements indicated by R 0 to R 3 indicate cell-specific reference signals of the antenna ports 0 to 3, respectively. Hereinafter, the cell-specific reference signals of the antenna ports 0 to 3 are also referred to as cell-specific RSs (CRSs). In this example, the case of the antenna ports in which the number of CRSs is 4 is described, but the number thereof can be changed. For example, the CRS can use one antenna port or two antenna ports. Further, the CRS can shift in the frequency direction on the basis of the cell ID. For example, the CRS can shift in the frequency direction on the basis of a remainder obtained by dividing the cell ID by 6.

Resource element indicated by C1 to C4 indicates reference signals (CSI-RS) for measuring transmission path states of the antenna ports 15 to 22. The resource elements denoted by C1 to C4 indicate CSI-RSs of a CDM group 1 to a CDM group 4, respectively. The CSI-RS is constituted by an orthogonal sequence (orthogonal code) using a Walsh code and a scramble code using a pseudo random sequence. Further, the CSI-RS is code division multiplexed using an orthogonal code such as a Walsh code in the CDM group. Further, the CSI-RS is frequency-division multiplexed (FDM) mutually between the CDM groups.

The CSI-RSs of the antenna ports 15 and 16 are mapped to C1. The CSI-RSs of the antenna ports 17 and 18 is mapped to C2. The CSI-RSs of the antenna port 19 and 20 are mapped to C3. The CSI-RSs of the antenna port 21 and 22 are mapped to C4.

A plurality of antenna ports of the CSI-RSs is specified. The CSI-RS can be set as a reference signal corresponding to eight antenna ports of the antenna ports 15 to 22. Further, the CSI-RS can be set as a reference signal corresponding to four antenna ports of the antenna ports 15 to 18. Further, the CSI-RS can be set as a reference signal corresponding to two antenna ports of the antenna ports 15 to 16. Further, the CSI-RS can be set as a reference signal corresponding to one antenna port of the antenna port 15. The CSI-RS can be mapped to some sub frames, and, for example, the CSI-RS can be mapped for every two or more sub frames. A plurality of mapping patterns is specified for the resource element of the CSI-RS. Further, the base station device 1 can set a plurality of CSI-RSs in the terminal device 2.

The CSI-RS can set transmission power to zero. The CSI-RS with zero transmission power is also referred to as a zero power CSI-RS. The zero power CSI-RS is set independently of the CSI-RS of the antenna ports 15 to 22. Further, the CSI-RS of the antenna ports 15 to 22 is also referred to as a non-zero power CSI-RS.

The base station device 1 sets CSI-RS as control information specific to the terminal device 2 through the RRC signaling. In the terminal device 2, the CSI-RS is set through the RRC signaling by the base station device 1. Further, in the terminal device 2, the CSI-IM resources which are resources for measuring interference power can be set. The terminal device 2 generates feedback information using the CRS, the CSI-RS, and/or the CSI-IM resources on the basis of a setting from the base station device 1.

Resource elements indicated by D1 to D2 indicate the DL-DMRSs of the CDM group 1 and the CDM group 2, respectively. The DL-DMRS is constituted using an orthogonal sequence (orthogonal code) using a Walsh code and a scramble sequence according to a pseudo random sequence. Further, the DL-DMRS is independent for each antenna port and can be multiplexed within each resource block pair. The DL-DMRSs are in an orthogonal relation with each other between the antenna ports in accordance with the CDM and/or the FDM. Each of DL-DMRSs undergoes the CDM in the CDM group in accordance with the orthogonal codes. The DL-DMRSs undergo the FDM with each other between the CDM groups. The DL-DMRSs in the same CDM group are mapped to the same resource element. For the DL-DMRSs in the same CDM group, different orthogonal sequences are used between the antenna ports, and the orthogonal sequences are in the orthogonal relation with each other. The DL-DMRS for the PDSCH can use some or all of the eight antenna ports (the antenna ports 7 to 14). In other words, the PDSCH associated with the DL-DMRS can perform MIMO transmission of up to 8 ranks. The DL-DMRS for the EPDCCH can use some or all of the four antenna ports (the antenna ports 107 to 110). Further, the DL-DMRS can change a spreading code length of the CDM or the number of resource elements to be mapped in accordance with the number of ranks of an associated channel.

The DL-DMRS for the PDSCH to be transmitted through the antenna ports 7, 8, 11, and 13 are mapped to the resource element indicated by D1. The DL-DMRS for the PDSCH to be transmitted through the antenna ports 9, 10, 12, and 14 are mapped to the resource element indicated by D2. Further, the DL-DMRS for the EPDCCH to be transmitted through the antenna ports 107 and 108 are mapped to the resource element indicated by D1. The DL-DMRS for the EPDCCH to be transmitted through the antenna ports 109 and 110 are mapped to the resource element denoted by D2.

<Details of Downlink Resource Elements Mapping of NR in Present Embodiment>

Figure 11:
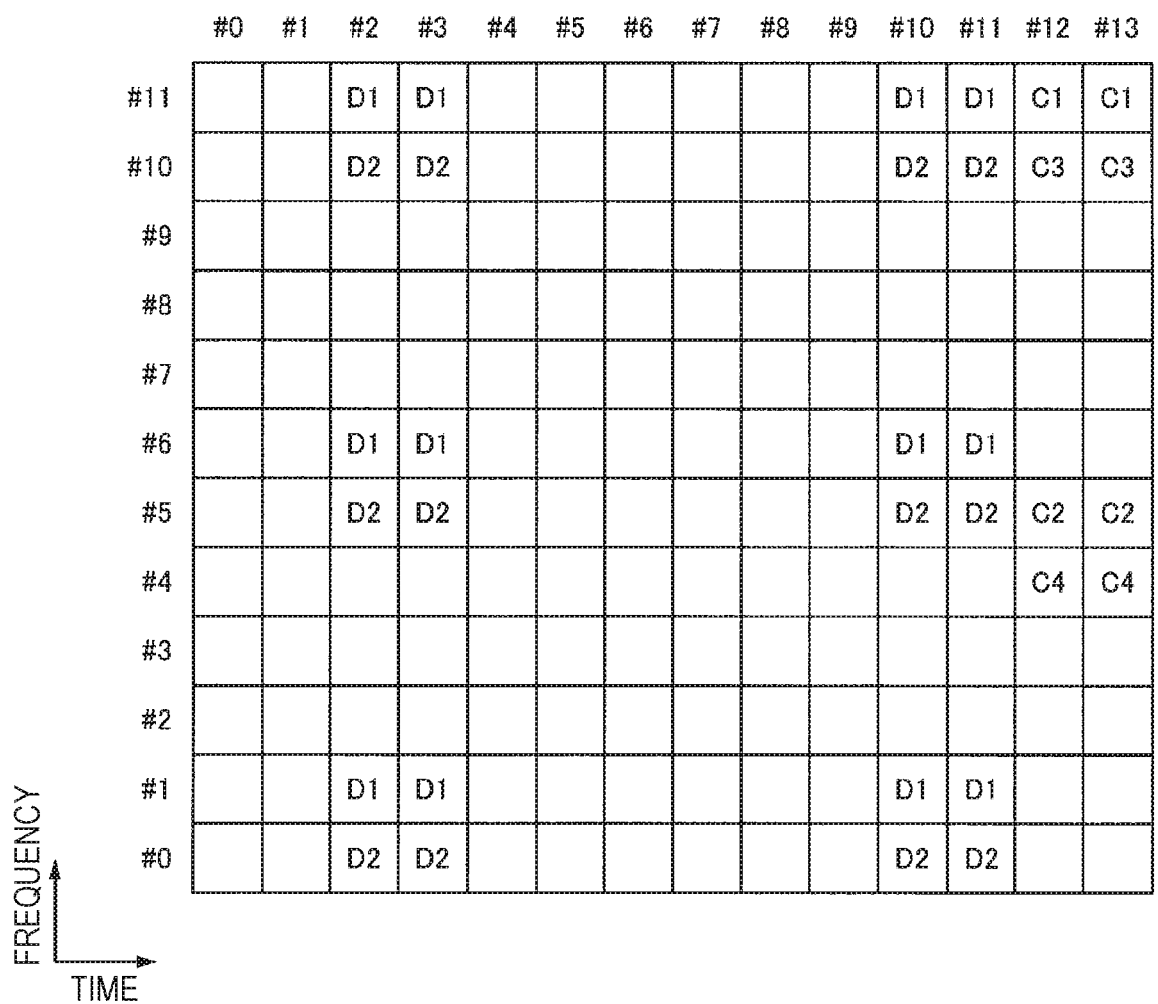
FIG. 11 is a diagram illustrating an example of downlink resource element mapping of NR according to the embodiment.

FIG. 11 is a diagram illustrating an example of the downlink resource element mapping of NR according to the present embodiment. FIG. 11 illustrates a set of resource elements in the predetermined resources in a case in which parameter set 0 is used. The predetermined resources illustrated in FIG. 11 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 11, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
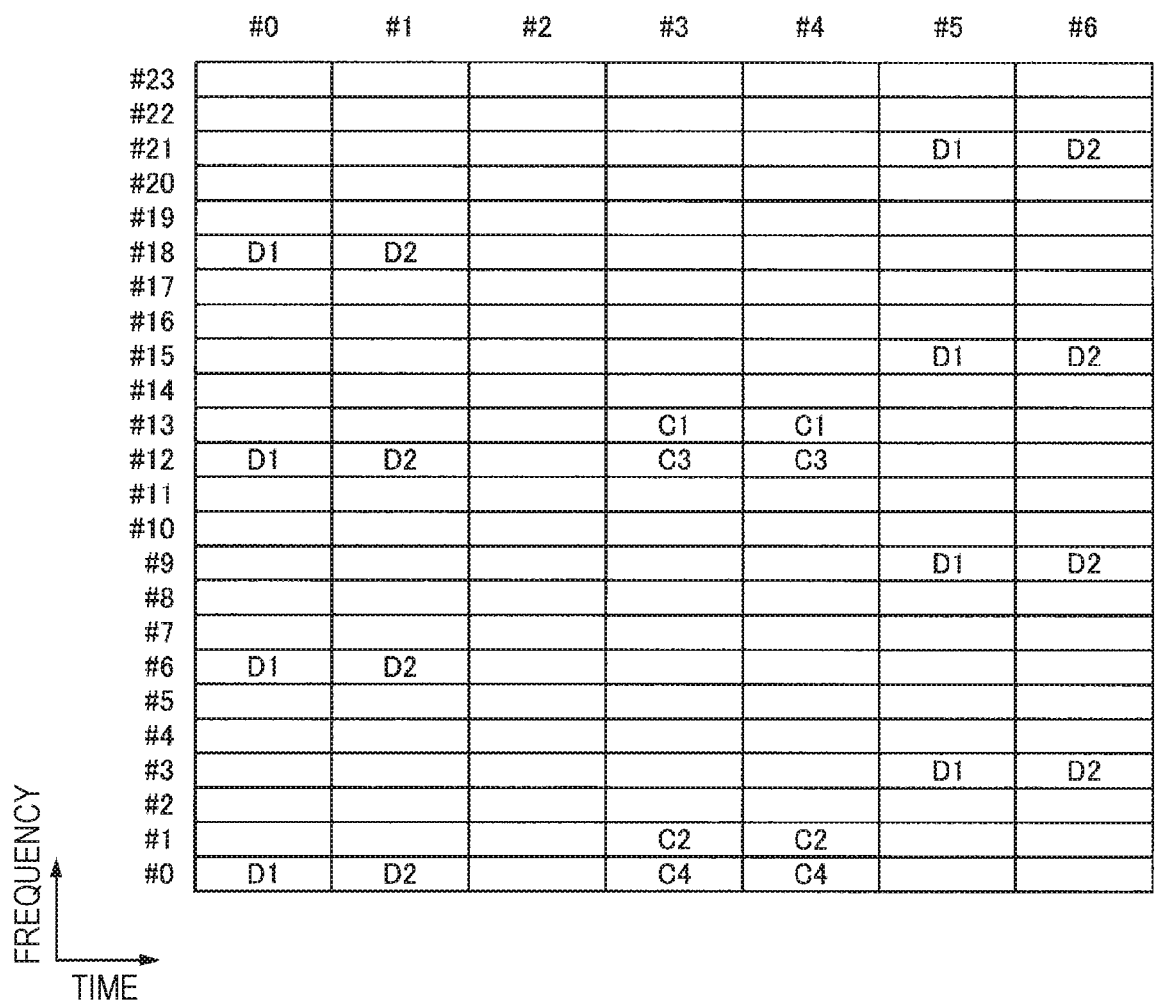
FIG. 12 is a diagram illustrating an example of downlink resource element mapping of NR according to the embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 15:
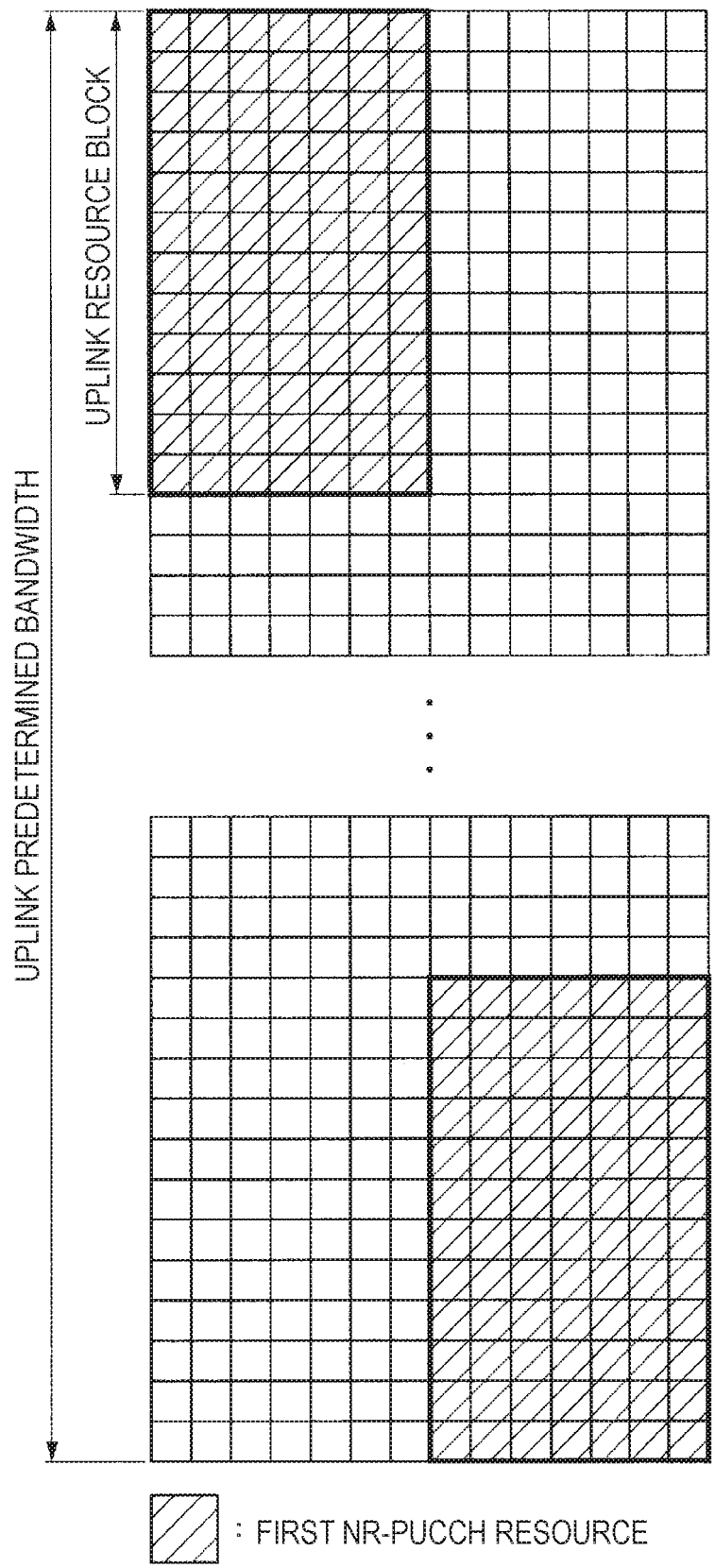
FIG. 15 is an explanatory diagram describing an example of a configuration of a first NR-PUCCH.

FIG. 15 is a diagram illustrating an example of the downlink resource element mapping of NR according to the present embodiment. FIG. 15 illustrates a set of resource elements in the predetermined resources in a case in which parameter set 1 is used. The predetermined resources illustrated in FIG. 15 are resources formed by the same time length and frequency bandwidth as one resource block pair in LTE.

Figure 13:
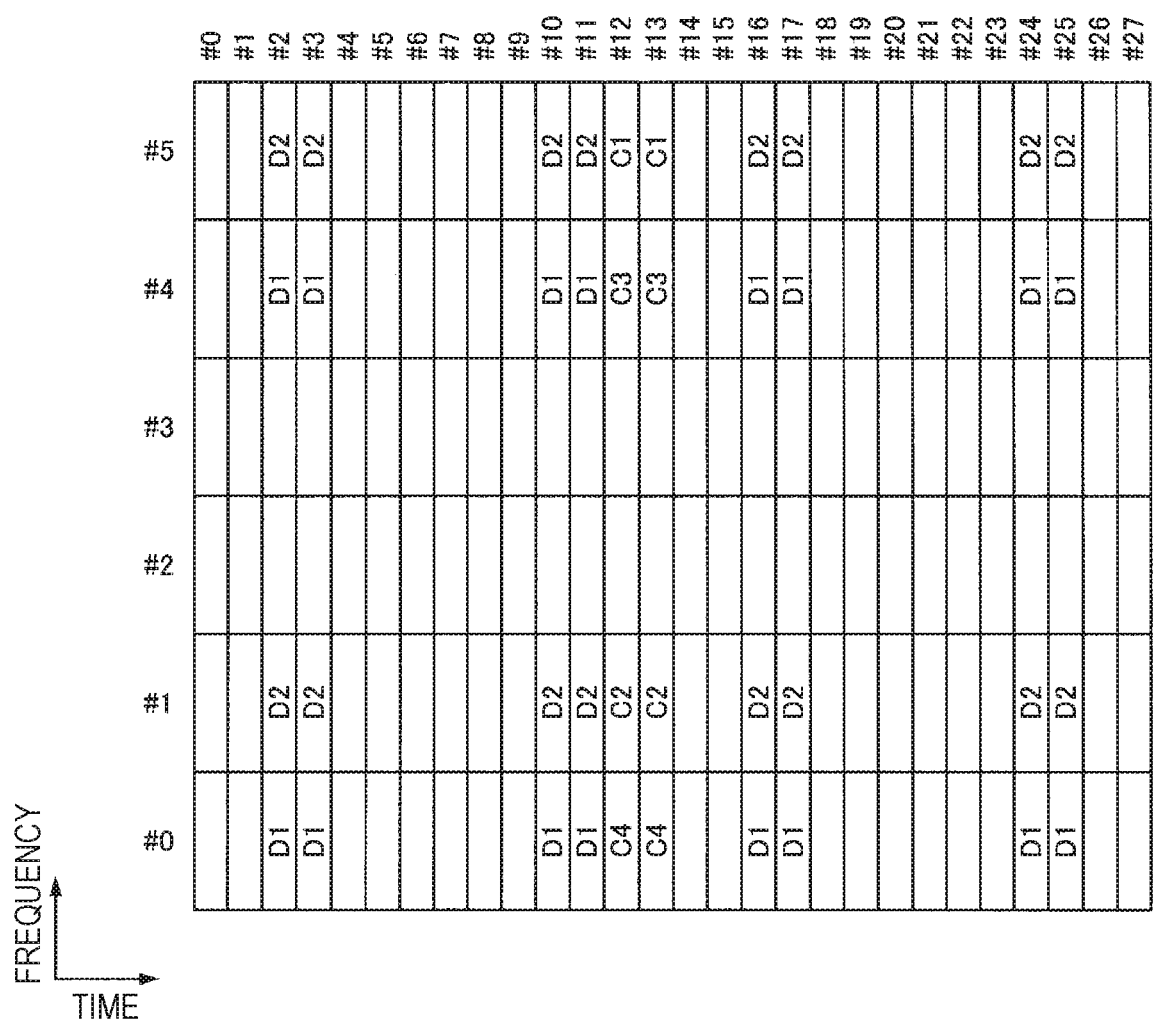
FIG. 13 is a diagram illustrating an example of downlink resource element mapping of NR according to the embodiment.

In the example of FIG. 13, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<1.10. Self-Contained Transmission>
<Details of Self-Contained Transmission of NR in Present Embodiment>

Figure 14:
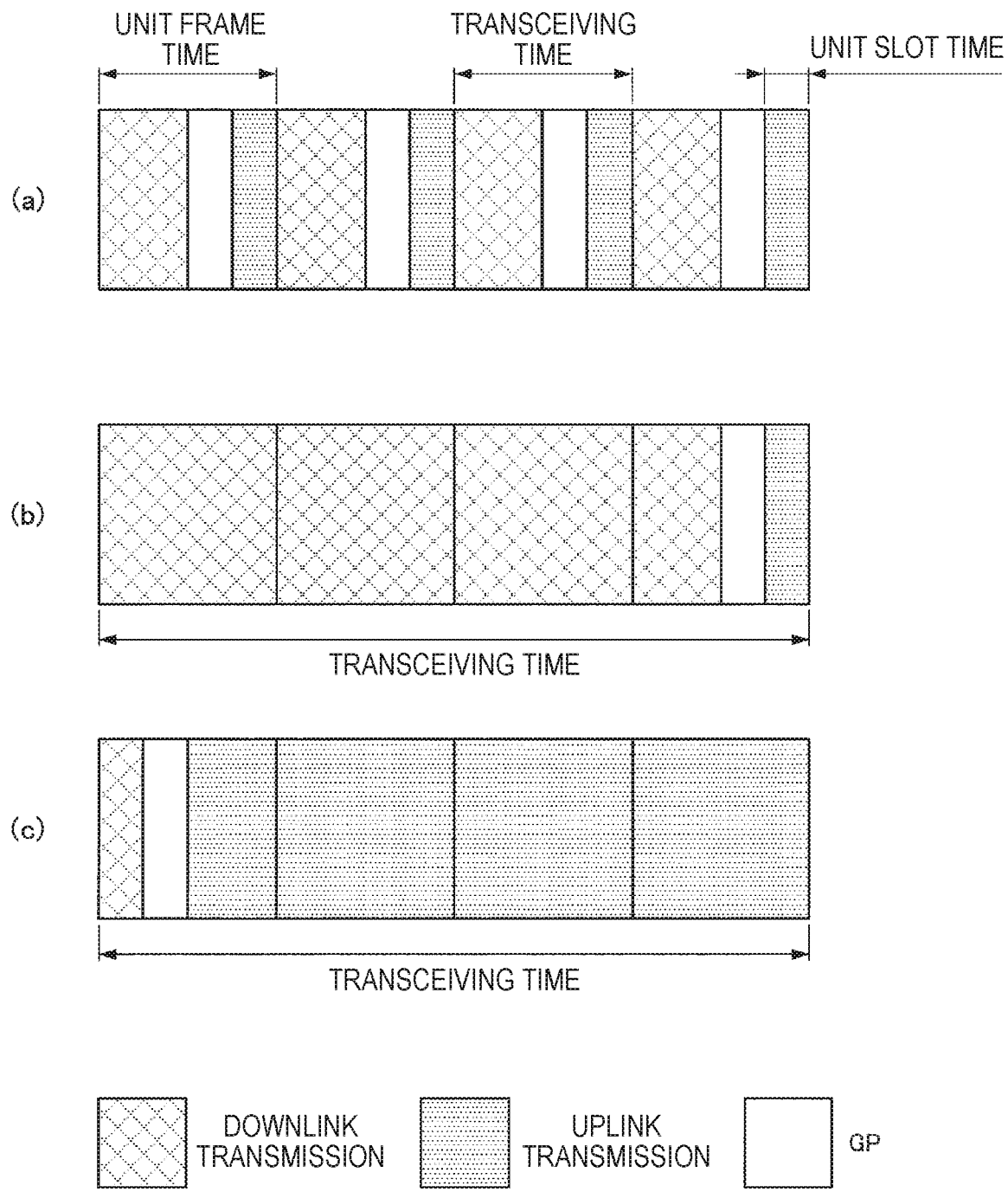
FIG. 14 is a diagram illustrating an example of a frame configuration of a self-contained transmission according to the embodiment.

In NR, a physical channel and/or a physical signal can be transmitted by self-contained transmission. FIG. 14 illustrates an example of a frame configuration of the self-contained transmission in the present embodiment. In the self-contained transmission, single transceiving includes successive downlink transmission, a GP, and successive downlink transmission from the head in this order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, it is possible to realize low-delay communication of the downlink.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 may not average the CSI measurement between different transceiving. The transceiving time may be referred to as TTI. One transceiving time is defined as, for example, an integer multiple of the sampling interval ($T_s$), the symbol length, the unit slot time, or the unit frame time of NR.

<1.11. Technical Features>
<Configuration of NR-PUCCH in Present Embodiment>

Hereinafter, a configuration of an NR-PUCCH will be described in the present embodiment.

First, the NR-PUCCH transmitted in a narrow bandwidth will be described as an example of the configuration of the NR-PUCCH. Note that, in the following description, this NR-PUCCH is also referred to as a "first NR-PUCCH."

Specifically, the first NR-PUCCH is transmitted using all the symbols in one resource block and sub frames. In this case, since the bandwidth is narrow, a reduction in transmission power such as PAPR can be expected.

Further, the NR-PUCCH transmitted in a wider bandwidth than the first NR-PUCCH and transmitted in a shorter time than the first NR-PUCCH will be described as another example of the configuration of the NR-PUCCH. Note that, in the following description, this NR-PUCCH is also referred to as a "second NR-PUCCH." As a specific example, the second NR-PUCCH can be transmitted using two symbols and seven resource blocks. Therefore, in a case in which the second NR-PUCCH is used, the transmission can end in a shorter time than the first NR-PUCCH. Moreover, the second NR-PUCCH is preferably used to carry ACK/NACK to the NR-PDSCH in the self-contained transmission.

<Details of First NR-PUCCH in Present Embodiment>

Next, the first NR-PUCCH will be described in detail below. FIG. 15 is an explanatory diagram illustrating an example of a configuration of the first NR-PUCCH. The first NR-PUCCH is transmitted using, for example, one resource block in one sub frame. Moreover, in order to obtain frequency diversity, a half (for example, seven symbols and one slot) of the first NR-PUCCH on the time axis can also be allocated to another resource block. Note that the first NR-PUCCH may be consecutively allocated to the same frequency resources in one sub frame. For example, in the example illustrated in FIG. 15, first NR-PUCCH resources are ensured to be point-symmetric centering on an uplink predetermined bandwidth (for example, an uplink bandwidth in which a terminal device is supported or an uplink system bandwidth of a base station device). In this way, the first NR-PUCCH may be allocated so that at least a part is different from another part in a position in the time direction and the frequency direction (that is, both a symbol and a resource block are different from each other) in one sub frame. In other words, the first NR-PUCCH may be allocated so that at least a part allocated for a partial period in one sub frame is allocated to a different resource block from another part allocated for another period.

Note that, in the base station device, resource blocks or resource elements not used as the first NR-PUCCH (resources other than hatched portions in FIG. 15) may be used to perform at least one process among another uplink transmission, another sidelink transmission, another sidelink reception, and another downlink reception of the base station device.

Moreover, in the terminal device, resource blocks or resource elements not used as the first NR-PUCCH (resources other than hatched portions in FIG. 15) may be used to perform at least one among another uplink transmission, another sidelink transmission, another sidelink reception, and another downlink reception of the terminal device.

Figure 16:
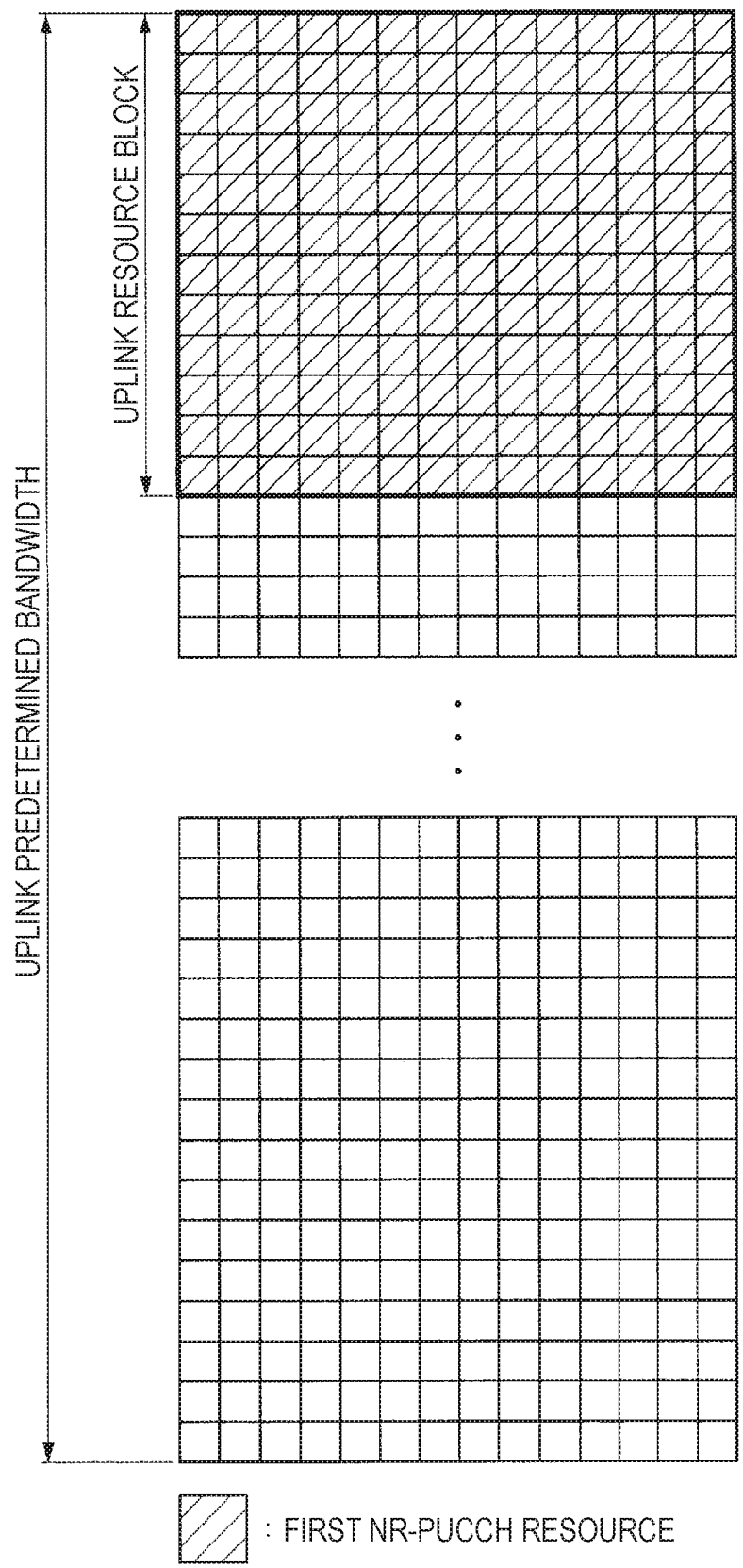
FIG. 16 is an explanatory diagram describing another example of a configuration of a first NR-PUCCH.

Moreover. FIG. 16 is an explanatory diagram illustrating another example of the configuration of the first NR-PUCCH. A difference from the example illustrated in FIG. 15 is that the first NR-PUCCH illustrated in FIG. 16 is transmitted using one pair of resource blocks. In this configuration, it is difficult to obtain the frequency diversity compared to the example illustrated in FIG. 15. However, since the same frequency bandwidth is used for a longer time, it is more satisfactory in channel estimation correction of the time direction. That is, in the example illustrated in FIG. 16, for example, in a case in which an uplink predetermined bandwidth is a narrow bandwidth or the like, satisfactory characteristics can be obtained in an environment in which the frequency diversity is not sufficiently obtained.

<Details of Second NR-PUCCH in Present Embodiment>

Figure 17:
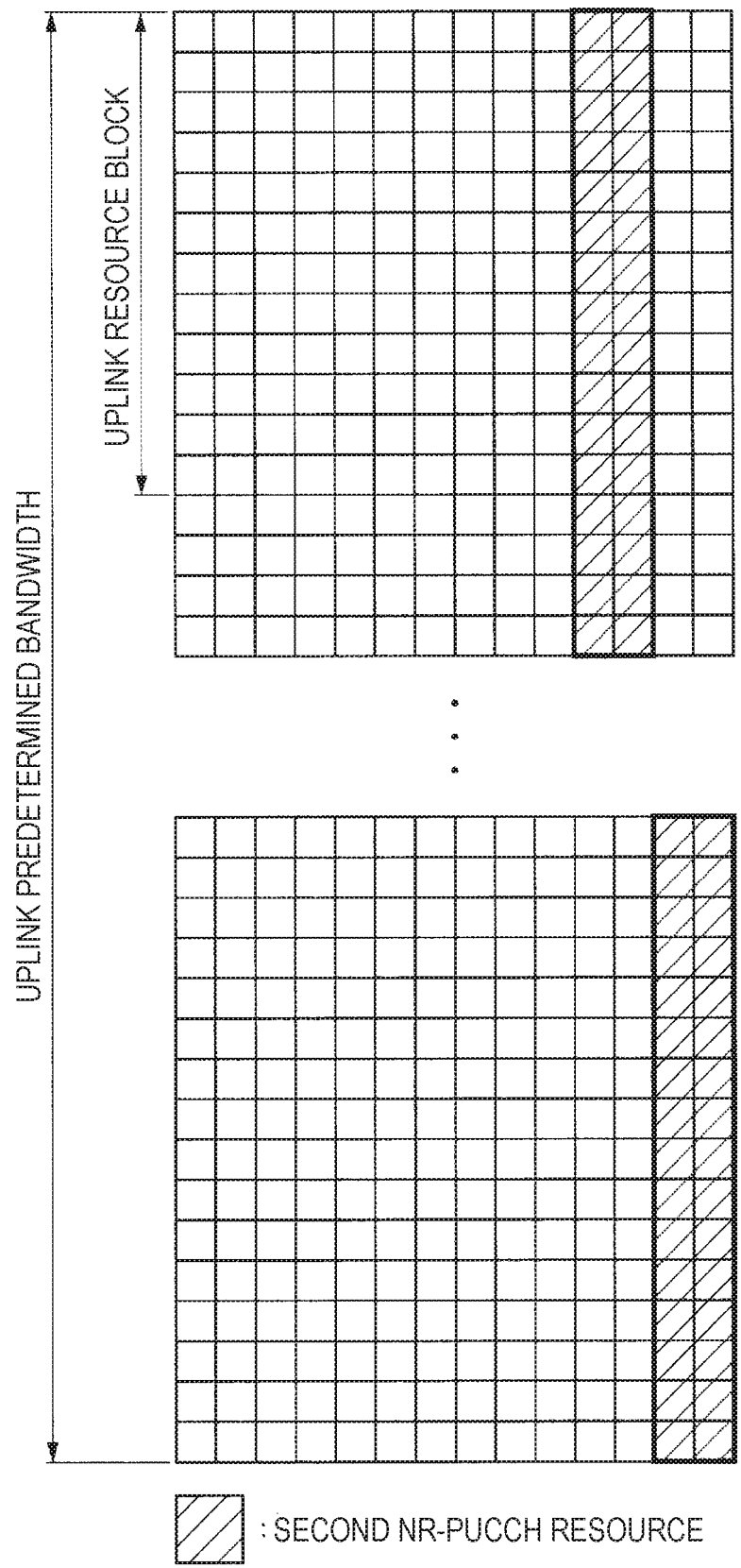
FIG. 17 is an explanatory diagram describing an example of a configuration of a second NR-PUCCH.

Next, the second NR-PUCCH will be described in detail below. FIG. 17 is an explanatory diagram illustrating an example of a configuration of the second NR-PUCCH. In the example illustrated in FIG. 17, the second NR-PUCCH is transmitted using, for example, four symbols and three resource blocks from the rear of the sub frame. Moreover, in order to obtain the frequency diversity, a half (for example, two symbols) of the second NR-PUCCH on the time axis can also be allocated to another resource block as in the first NR-PUCCH. For example, in the example illustrated in FIG. 17, second NR-PUCCH resources are ensured to be point-symmetric centering on an uplink predetermined bandwidth (for example, an uplink bandwidth in which a terminal device is supported or an uplink system bandwidth of the base station device). In this way, the second NR-PUCCH may be allocated so that at least a part is different from another part in a position in the time direction and the frequency direction (that is, both a symbol and a resource block are different from each other) in one sub frame. In other words, the second NR-PUCCH may be allocated so that at least a part allocated to a part of the resource block is allocated for a different period in one sub frame from another part allocated to another resource block.

Note that, in the terminal device, resource blocks or resource elements not used as the second NR-PUCCH (resources other than hatched portions in FIG. 17) may be used to perform at least one among another uplink transmission, another sidelink transmission, another sidelink reception, and another downlink reception of the terminal device.

Note that, in the base station device, resource blocks or resource elements not used as the second NR-PUCCH (resources other than hatched portions in FIG. 17) may be used to perform at least one process among another uplink transmission, another sidelink transmission, another sidelink reception, and another downlink reception of the base station device.

Figure 18:
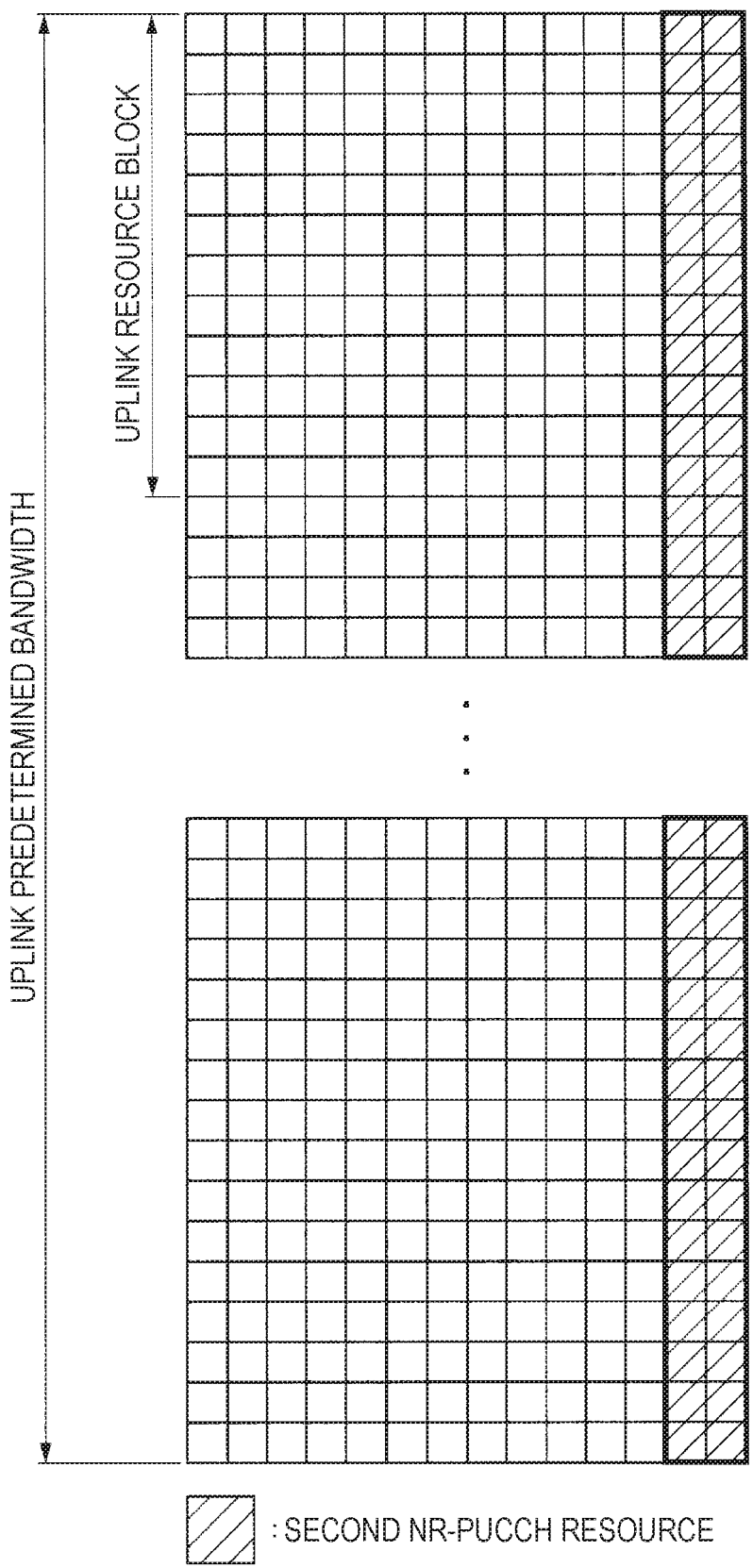
FIG. 18 is an explanatory diagram describing another example of a configuration of a second NR-PUCCH.

Moreover, FIG. 18 is an explanatory diagram illustrating another example of the configuration of the second NR-PUCCH. The example illustrated in FIG. 17 is different from the example illustrated in FIG. 18 in that the second NR-PUCCH is transmitted with a wider bandwidth using seven resource blocks and two symbols. Therefore, in the example illustrated in FIG. 18, a time necessary to transmit and receive the second NR-PUCCH is shorter, and thus it is possible to realize lower-latency communication.

<Logical-Physical Mapping of NR-PUCCH Resources in Present Embodiment>

Next, logical-physical mapping of NR-PUCCH resources will be described below.

Figure 19:
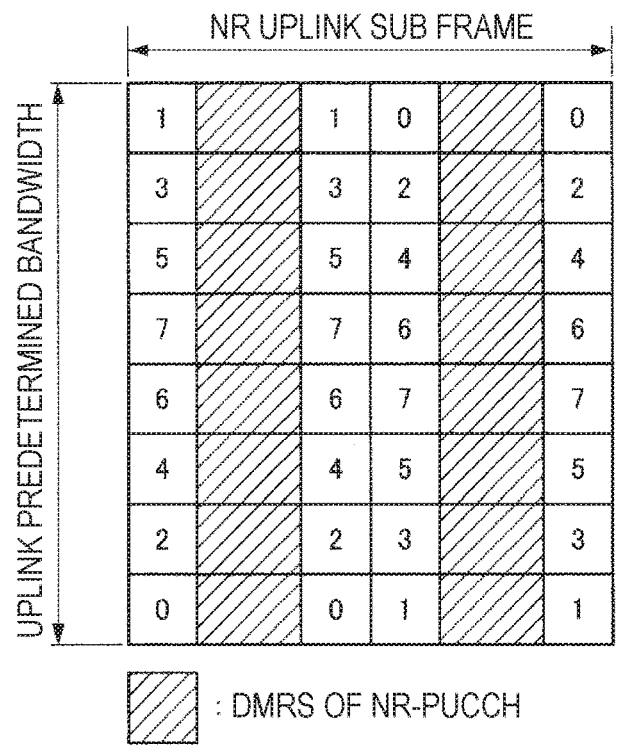
FIG. 19 is an explanatory diagram describing an example of logical-physical mapping of first NR-PUCCH resources.

First, an example of logical-physical mapping of the first NR-PUCCH resources will be described. For example, FIG. 19 is an explanatory diagram illustrating an example of logical-physical mapping of the first NR-PUCCH resources. In FIG. 19, a number affixed to each physical resource indicates a logical number (index) of the NR-PUCCH resource. In a case in which the index of the PUCCH resource is instructed, the index is mapped to a physical resource illustrated in FIG. 19. Moreover, in the example illustrated in FIG. 19, indexes are first allocated in sequence from the beginning in the time direction and indexes are later allocated in sequence from a low frequency. In other words, in the example illustrated in FIG. 19, the indexes are preferentially allocated in sequence in the time direction from an end side of the frequency bandwidth in the frequency direction. Moreover, as in the example illustrated in FIG. 15, the indexes are allocated to be point-symmetric centering on an uplink predetermined bandwidth.

Figure 20:
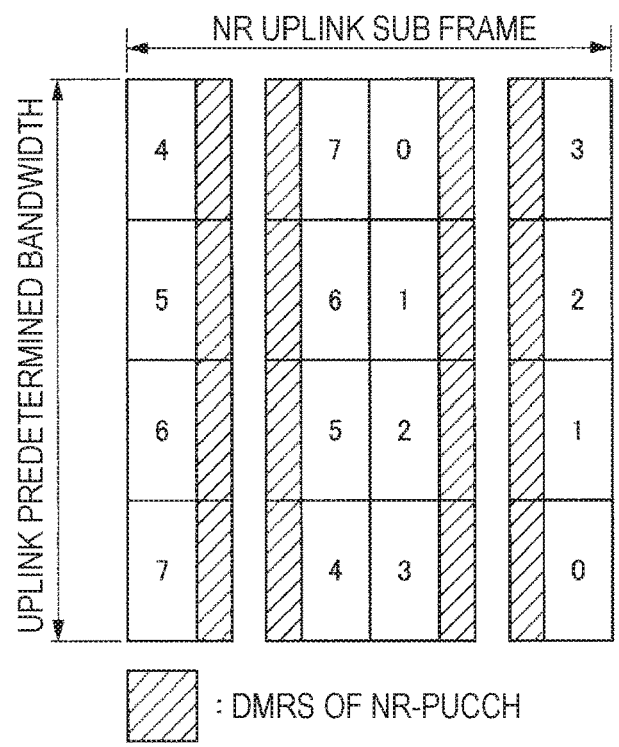
FIG. 20 is an explanatory diagram describing an example of logical-physical mapping of second NR-PUCCH resources.

Next, an example of logical-physical mapping of the second NR-PUCCH resources will be described. For example, FIG. 20 is an explanatory diagram illustrating an example of logical-physical mapping of the second NR-PUCCH resources. Specifically, FIG. 20 illustrates an example of the logical-physical mapping in a case in which the configuration of the second NR-PUCCH described with reference to FIG. 17 is assumed. In FIG. 20, a number affixed to each physical resource indicates a logical number (index) of the NR-PUCCH resource. In a case in which the index of the PUCCH resource is instructed, the index is mapped to a physical resource illustrated in FIG. 20. The example illustrated in FIG. 20 is different from the example illustrated in FIG. 19 in that indexes are first allocated in sequence in the frequency direction and indexes are later allocated in sequence from the rear in the time direction. In other words, in the example illustrated in FIG. 20, the indexes are preferentially allocated in sequence in the frequency direction from the rear side in the time direction during a predetermined period of a sub frame or the like. Thus, it is easy to allocate the second NR-PUCCH to the rear side of the sub frame (that is, the rear end side in the time direction). That is, in the example illustrated in FIG. 20, it is possible to ensure a wider region on the front side in the time direction than the region to which the second NR-PUCCH is allocated. For example, it is possible to allocate downlink resources to the region on the front side more flexibly. Therefore, by realizing the configuration illustrated in FIG. 20, for example, it is possible to realize the self-contained transmission with good resource efficiency.

Figure 21:
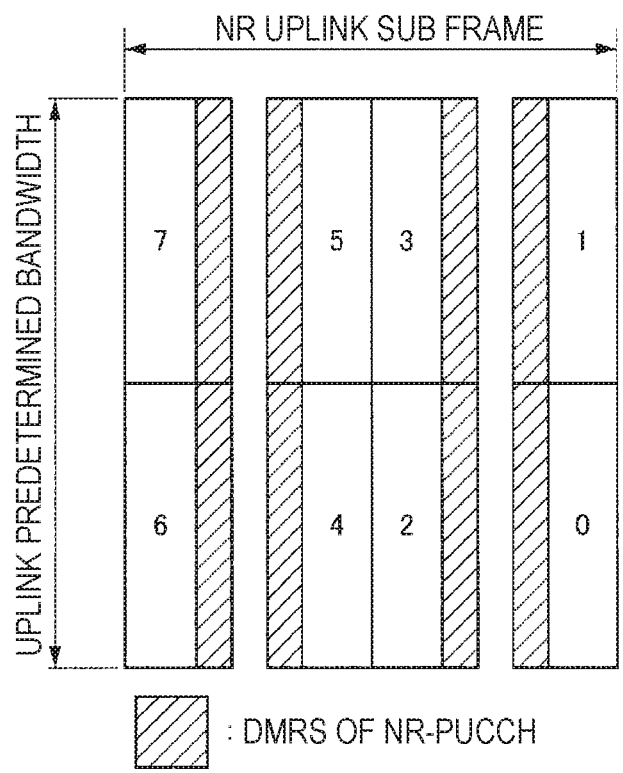
FIG. 21 is an explanatory diagram describing another example of logical-physical mapping of second NR-PUCCH resources.

Moreover, FIG. 21 is an explanatory diagram illustrating another example of the logical-physical mapping of the second NR-PUCCH resources. Specifically, FIG. 21 illustrates another example of the logical-physical mapping in a case in which the configuration of the second NR-PUCCH described with reference to FIG. 18 is assumed. In the example illustrated in FIG. 21, it is easier to aggregate the second NR-PUCCH on the rear side of the sub frame than in the example illustrated in FIG. 20. Therefore, by realizing the configuration illustrated in FIG. 21, for example, it is possible to realize the self-contained transmission with better resource efficiency.

Note that, although the NR-PUCCH resources in the time and frequency domains have been described in each of the above-described examples, the indexes of the NR-PUCCH resources may also be allocated on a code axis when code multiplexing is possible.

<Allocation of NR-PUCCH Resources in Present Embodiment>

Next, an allocation scheme for the NR-PUCCH resources will be described below.

As an example of the allocation technique for the NR-PUCCH resources, the NR-PUCCH resources may be decided in accordance with a terminal device on the basis of an NR-PDCCH to which the NR-PDCCH corresponding to an ACK/NACK response included in the NR-PUCCH is scheduled.

Moreover, as another example of the allocation technique for the NR-PUCCH resources based on the NR-PDCCH, a terminal device may be notified of indexes of the NR-PUCCH resources by a predetermined field with an NR-DCI format included in the NR-PDCCH.

Moreover, as still another example of the allocation technique for the NR-PUCCH resources based on the NR-PDCCH, the terminal device may be notified of association information with the indexes of the NR-PUCCH resources or the resource block of the NR-PUCCH by a predetermined field with the NR-DCI format included in the NR-PDCCH. A relation between the indexes of the NR-PUCCH resources or the resource block of the NR-PUCCH and bit information of the predetermined field may be set with, for example, an RRC message.

Moreover, as still another example of the allocation technique for the NR-PUCCH resources based on the NR-PDCCH, the terminal device may be notified of the resource block transmitted by the NR-PUCCH with a predetermined field of the NR-DCI format included in the NR-PDCCH. The information with which the resource block is notified of may have the same instruction format as, for example, the resource block used to schedule the NR-PDSCH.

Moreover, as still another example of the allocation technique for the NR-PUCCH resources based on the NR-PDCCH, the NR-PUCCH resources may be decided in association with an NR-CCE to which the NR-PDCCH is mapped. As a specific example, indexes of the head of the NR-CCE included in the NR-PDCCH are associated with the indexes of the NR-PUCCH resources. More specifically, the indexes of the NR-PUCCH resources are decided on the basis of an NR-CCE index and a predetermined offset. The predetermined offset is decided in accordance with dedicated RRC information or information of NR-DCI included in the NR-PDCCH.

Moreover, as still another example of the allocation scheme for the NR-PUCCH resources, the NR-PUCCH resources may be decided in association with the resource block in which the NR-PDSCH corresponding to ACK/NACK carrying the NR-PUCCH is used. As a specific example, a minimum resource block index in the resource block in which the NR-PDSCH is used is associated with the index of the NR-PUCCH resources. More specifically, the indexes of the NR-PUCCH resources may be decided on the basis of the minimum resource block index and a predetermined offset. Moreover, the predetermined offset may be decided in accordance with dedicated RRC information or information of NR-DCI included in the NR-PDCCH.

<Multiplexing of NR-PUCCH in Present Embodiment>

The first NR-PUCCH and the second NR-PUCCH may be multiplexed in the same NR carrier (NR cell). Thus, it is possible to accommodate communication of different request conditions in one carrier and it is possible to operate the system with better efficiency.

Figure 22:
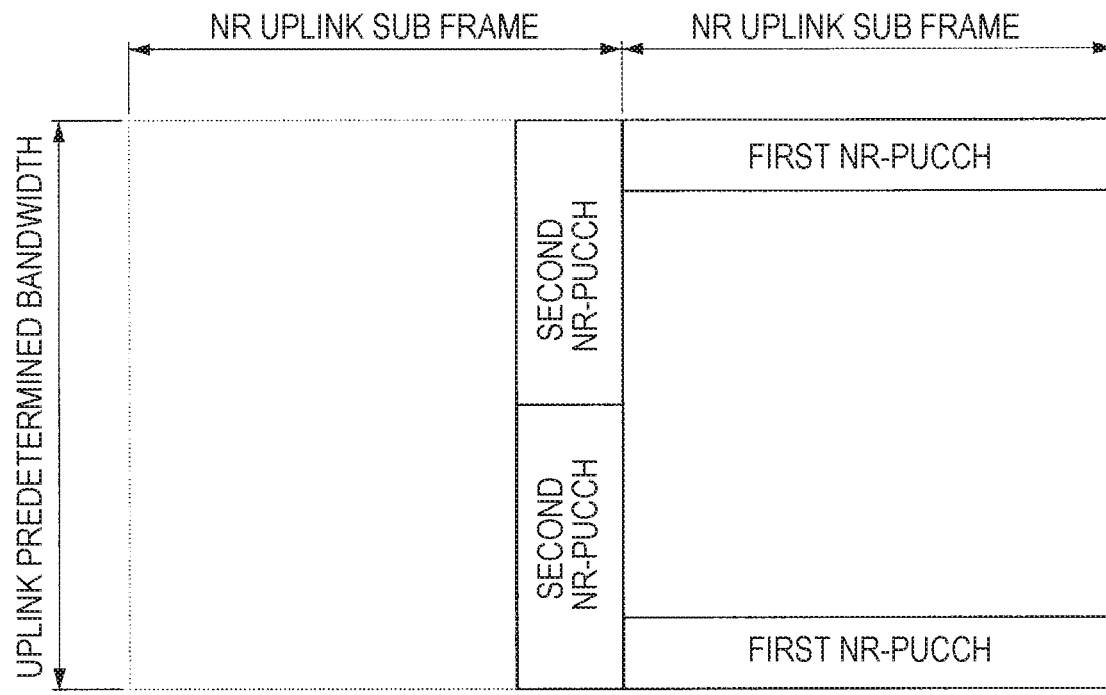
FIG. 22 is an explanatory diagram illustrating an example of time domain multiplexing of a first NR-PUCCH and a second NR-PDCCH.

For example, the first NR-PUCCH and the second NR-PUCCH may be multiplexed on the time axis. As a specific example, the first NR-PUCCH and the second NR-PUCCH may be multiplexed in different sub frames. For example, FIG. 22 is an explanatory diagram illustrating an example of time domain multiplexing of the first NR-PUCCH and the second NR-PDCCH. In the example illustrated in FIG. 22, the second NR-PUCCH is transmitted in an earlier NR uplink sub frame and the first NR-PUCCH is transmitted in a later NR uplink sub frame.

Figure 23:
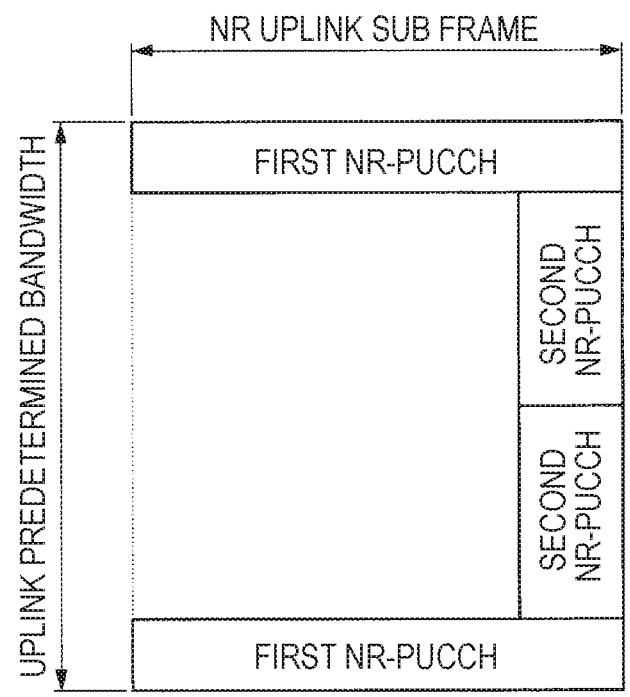
FIG. 23 is an explanatory diagram illustrating an example of frequency domain multiplexing of a first NR-PUCCH and a second NR-PUCCH.

Moreover, the first NR-PUCCH and the second NR-PUCCH may be multiplexed on the frequency axis. As a specific example, the first NR-PUCCH and the second NR-PUCCH may be multiplexed in different resource blocks. For example, FIG. 23 is an explanatory diagram illustrating an example of frequency domain multiplexing of the first NR-PUCCH and the second NR-PDCCH. In the example illustrated in FIG. 23, the first NR-PUCCH is transmitted at an end portion of an uplink predetermined bandwidth and the second NR-PUCCH is transmitted at a central portion of the uplink predetermined bandwidth.

Note that the first NR-PUCCH and the second NR-PUCCH may be multiplexed on a spatial axis. Moreover, the first NR-PUCCH and the second NR-PUCCH may be multiplexed on a code axis.

<Switching of NR-PUCCH in Present Embodiment>

Next, the details of switching between two types of NR-PUCCHs (that is, switching between the first NR-PUCCH and the second NR-PUCCH) in the present embodiment will be described below.

The terminal device can switch transmission of the first NR-PUCCH and the second NR-PUCCH in accordance with a predetermined condition. For example, a configuration of the NR-PUCCH to be transmitted (in other words, the configuration of the NR-PUCCH requested to realize a use case) is different between a case in which low consumption power is requested and a case in which low latency is requested. Thus, it is possible to realize flexible communication in accordance with different request conditions.

As an example of switching means of the NR-PUCCH, the terminal device may switch between types of NR-PUCCHs to be transmitted (that is, may switch between the first NR-PUCCH and the second NR-PUCCH) on the basis of the NR-PDCCHs.

As an example of a switching condition based on the NR-PDCCH, the terminal device may switch the types of NR-PUCCHs on the basis of a timing at which transmission of the NR-PUCCH is instructed. For example, as in the example illustrated in FIG. 22, the terminal device may transmit the second NR-PUCCH in a case in which the transmission of the NR-PUCCH with an early NR uplink sub frame is instructed and may transmit the first NR-PUCCH in a case in which transmission of the NR-PUCCH in a later NR uplink sub frame is instructed.

Note that information for instructing a transmission timing of the NR-PUCCH may be, for example, information for instructing the self-contained transmission. As a specific example, in a case in which the self-contained transmission is not instructed, the terminal device may perform transmission with a predetermined sub frame (for example, a sub frame later by four sub frames from the sub frame received with the NR-PDCCH) using the first NR-PUCCH. Conversely, in a case in which the self-contained transmission is instructed, the terminal device may perform transmission with the same sub frame as the channel instructed with the NR-PDCCH using the second NR-PUCCH.

Moreover, the information for instructing the transmission timing of the NR-PUCCH may be, for example, offset information for instructing an NR uplink sub frame with which the NR-PUCCH is transmitted. As a specific example, the offset information may be offset information from an end timing of the received NR-PDCCH or an end timing of a channel scheduled by the NR-PDCCH. Moreover, as another example, the offset information may be offset information from a start timing of the received NR-PDCCH or a start timing of the channel scheduled by the NR-PDCCH. Moreover, in a case in which the offset information is equal to or less than a predetermined value, the terminal device may transmit the first NR-PUCCH. Conversely, in a case in which the offset information is equal to or greater than a predetermined value, the terminal device may transmit the second NR-PUCCH. Note that the timing and the offset information is preferably, for example, one of an NR sub frame, a slot, and a symbol.

Moreover, the information for instructing the transmission timing of the NR-PUCCH may be, for example, information regarding a timing number for instructing the NR uplink sub frame with which the NR-PUCCH is transmitted. The timing number is preferably one of a system frame number (SFN), a sub frame number, a slot number, and a symbol number. Here, in a case in which the transmission is difficult at a timing instructed by the information as the timing in accordance with a processing capability of the terminal device as in a case or the like in which preparation for transmitting the NR-PUCCH is late, the NR-PUCCH may be transmitted at a subsequent timing. Moreover, in a case in which the transmission can be performed at a timing instructed by the notified information, the terminal device may transmit the second NR-PUCCH at the timing. Conversely, in a case in which it is difficult to perform the transmission at the timing instructed by the notified information, the terminal device may transmit the first NR-PUCCH at a subsequent timing.

Moreover, the information for instructing the transmission timing of the NR-PUCCH may be, for example, information regarding a channel length of the NR-PDSCH or the NR-PUSCH scheduled by the NR-DCI included in the NR-PUCCH. Specifically, the information regarding the channel length of the NR-PDSCH or the NR-PUSCH may be information indicating end of the channel of the NR-PDSCH or the NR-PUSCH. Note that the terminal device may transmit the first NR-PUCCH in a case in which the notified information indicates end later than a predetermined end timing. Conversely, the terminal device may transmit the second NR-PUCCH in a case in which the notified information indicates end earlier than a predetermined end timing. The first NR-PUCCH transmitted in a case in which the notified information indicates end later than the predetermined end timing is preferably transmitted with a sub frame later than the sub frame transmitted with the NR-PDSCH or the NR-PUSCH. Moreover, the second NR-PUCCH transmitted in a case in which the notified information indicates end earlier than the predetermined end timing is preferably transmitted with the same sub frame as the sub frame transmitted with the NR-PDSCH or the NR-PUSCH. Note that information regarding the predetermined end timing is preferably information regarding a symbol unit and may be information regarding a slot unit.

Moreover, as an example of the switching condition on the basis of the NR-PDCCH, the terminal device may perform the switching on the basis of information for instructing the switching of the type of NR-PUCCH. Specifically, the information for instructing to switch the type of NR-PUCCH may be information in accordance with a bit format indicating transmission of the first NR-PUCCH or the second NR-PUCCH. Note that in a case in which the bit indicates 1, the terminal device may transmit the first NR-PUCCH. In a case in which the bit indicates 0, the terminal device may transmit the second NR-PUCCH.

Moreover, as an example of switching means of the NR-PUCCH, the terminal device may switch the type of NR-PUCCH to be transmitted on the basis of an RRC message.

The RRC message may include, for example, a setting parameter for instructing the self-contained transmission. In this case, in a case in which the self-contained transmission is not instructed in accordance with the parameter, the terminal device may transmit a predetermined sub frame (for example, a sub frame later by four sub frames from the sub frame with which the NR-PDCCH is received) using the first NR-PUCCH. Conversely, in a case in which the self-contained transmission is instructed in accordance with the parameter, the terminal device may transmit the same sub frame as the channel instructed with the NR-PDCCH using the second NR-PUCCH.

Moreover, the RRC message may include, for example, a setting parameter regarding the NR-PUCCH. In this case, in a case in which the first NR-PUCCH is set in accordance with the setting parameter, the terminal device may transmit the first NR-PUCCH. Moreover, in a case in which the second NR-PUCCH is set in accordance with the setting parameter, the terminal device may transmit the second NR-PUCCH. Note that in the case in which the setting of both the first NR-PUCCH and the second NR-PUCCH is performed in accordance the setting parameter, the second NR-PUCCH is preferably transmitted.

Note that in a case in which the terminal device is in a state in which RRC connection is not established (an RRC idle state), the terminal device may transmit the first NR-PUCCH.

The RRC message for instructing the switching in the base station device may be transmitted to the terminal device on the basis of the capability of the terminal device. Therefore, the terminal device may transmit information indicating the capability to the base station device. Examples of the information regarding the capability include a parameter indicating a terminal category suggesting that a processing capability of a high function is mounted, a parameter indicating whether to realize the self-contained transmission, a parameter indicating whether to transmit the second NR-PUCCH, and a parameter indicating a generation processing time of the NR-PUCCH.

Moreover, as another example of the switching means of the NR-PUCCH, the type of NR-PUCCH may be switched in a case in which a predetermined condition is satisfied in the terminal device.

As an example of the predetermined condition, a condition indicating whether or not a type of information (UCI) carried with the NR-PUCCH is a predetermined type can be exemplified. As a specific example, when the information carried with the NR-PUCCH is CSI, the terminal device may transmit the information using the first NR-PUCCH. On the other hand, when the information carried with the NR-PUCCH is only ACK/NACK of the NR-PDSCH, the terminal device may transmit the information using the second NR-PUCCH. In other words, when the information carried with the NR-PUCCH includes CSI, the terminal device transmits the information using the first NR-PUCCH. When the information does not include CSI, the terminal device may transmit the information using the second NR-PUCCH.

Note that the base station device may acquire new information depending on whether one of the first NR-PUCCH and the second NR-PUCCH is received. For example, in a case in which the first NR-PUCCH is received, the base station device may recognize that the corresponding terminal device transmits a scheduling request (SR). Conversely, in a case in which the second NR-PUCCH is received, the base station device may recognize that the corresponding terminal device does not transmit the scheduling request (SR). Moreover, in a case in which uplink data desired to be transmitted is generated, the terminal device may transmit the first NR-PUCCH. In other cases, the terminal device may transmit the second NR-PUCCH.

Moreover, as another example of the predetermined condition, a condition indicating whether the number of bits of ACK/NACK transmitted with one NR-PUCCH is equal to or greater than a predetermined value can be exemplified. As a specific example, in a case in which the number of bits of the ACK/NACK is equal to or greater than the predetermined value, the terminal device may transmit the first NR-PUCCH. Conversely, in a case in which the number of bits of the ACK/NACK is equal to or less than the predetermined value, the terminal device may transmit the second NR-PUCCH. Note that instead of the number of bits of ACK/NACK, the number of sub frames with which the NR-PDSCH corresponding to the ACK/NACK is transmitted or the number of serving cells set in accordance with carrier aggregation may be applied as the predetermined condition.

Moreover, as still another example of the predetermined condition, a condition indicating whether a bandwidth (band) with which the NR-PUCCH is transmitted is a predetermined bandwidth can be exemplified. As a specific example, in a case in which the bandwidth (band) with which the NR-PUCCH is transmitted is not an unlicensed band such as 5 GHz, the terminal device may transmit the first NR-PUCCH. Conversely, in a case in which the bandwidth (band) with which the NR-PUCCH is transmitted is the unlicensed band, the terminal device may transmit the second NR-PUCCH.

Moreover, as still another example of the predetermined condition, a condition indicating whether the NR-PUCCH to be transmitted is a predetermined physical parameter can be exemplified. As a specific example, in a case in which an instruction to transmit the NR-PUCCH is given with the predetermined physical parameter, the terminal device may transmit the first NR-PUCCH. Conversely, in a case in which the instruction to transmit the NR-PUCCH is given with a physical parameter different from the predetermined physical parameter, the terminal device may transmit the second NR-PUCCH.

Moreover, as still another example of the predetermined condition, a condition based on a result obtained by comparing transmission power of the NR-PUCCH to a predetermined value can be exemplified. As a specific example, in a case in which transmission power of the second NR-PUCCH is calculated and a calculation result of the transmission power is equal to or greater than a predetermined value, the terminal device may transmit the first NR-PUCCH. Conversely, in a case in which the calculation result of the transmission power is less than a predetermined value, the terminal device may transmit the second NR-PUCCH.

Moreover, as still another example of the predetermined condition, a condition indicating whether a bandwidth (band) with which the NR-PDSCH corresponding to an ACK/NACK response carried with the NR-PUCCH is transmitted is a predetermined bandwidth can be exemplified.

Moreover, as still another example of the predetermined condition, a condition indicating whether an instruction to transmit the NR-PUCCH in accordance with the waveform of a predetermined carrier wave is given can be exemplified. As a specific example, in a case in which uplink transmission is transmission with SC-FDMA such as DFT-S-OFDM, the terminal device may perform the transmission using the first NR-PUCCH. Conversely, in a case in which the uplink transmission is transmission with OFDM, the terminal device may perform the transmission using the second NR-PUCCH.

Moreover, as still another example of the predetermined condition, a condition indicating whether a type of RAT set in accordance with dual connectivity is predetermined RAT can be exemplified. As a specific example, in a case in which dual connectivity with LTE is set, the terminal device may transmit the first NR-PUCCH. Conversely, in a case in which dual connectivity with only NR is set, the terminal device may transmit the second NR-PUCCH.

Note that the above-described switching of the NR-PUCCH has been described focusing on the switching between the first NR-PUCCH and the second NR-PUCCH, but the foregoing condition can be applied as in switching of a parameter in the first NR-PUCCH or switching of a parameter in the second NR-PUCCH. Here, as the switching of the parameter in the first NR-PUCCH, for example, switching or the like of the number of resource blocks used in the first NR-PUCCH can be exemplified. Moreover, as the switching of the parameter in the second NR-PUCCH, for example, switching or the like of the number of symbols used in the second NR-PUCCH can be exemplified.

Moreover, by substituting the foregoing NR-PUCCHs with sidelink ACK/NACK channels carrying ACK/NACK responses corresponding to NR-PSSCHs in a sidelink, it is possible to expect advantageous effects similar to those of uplink communication in sidelink communication.

Note that the configurations and the mapping method of the above-described first NR-PUCCH and second NR-PUCCH are not limited to NR, but similar configurations and means can be applied even in LTE or other RAT.

Moreover, the switching of the above-described NR-PUCCH and the NR-PUCCH is not limited only to NR, but similar means can be applied even in LTE or other RAT.

2. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently. Moreover, at least some of the constituent elements of the base station device 1 may be realized in a base station device or a module for the base station device.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, at least some of the constituent elements of the terminal device 2 may be realized in a module mounted on the terminal (for example, an integrated circuit module configured on one die).

<2.1. Application Examples for Base Station>

First Application Example

Figure 24:
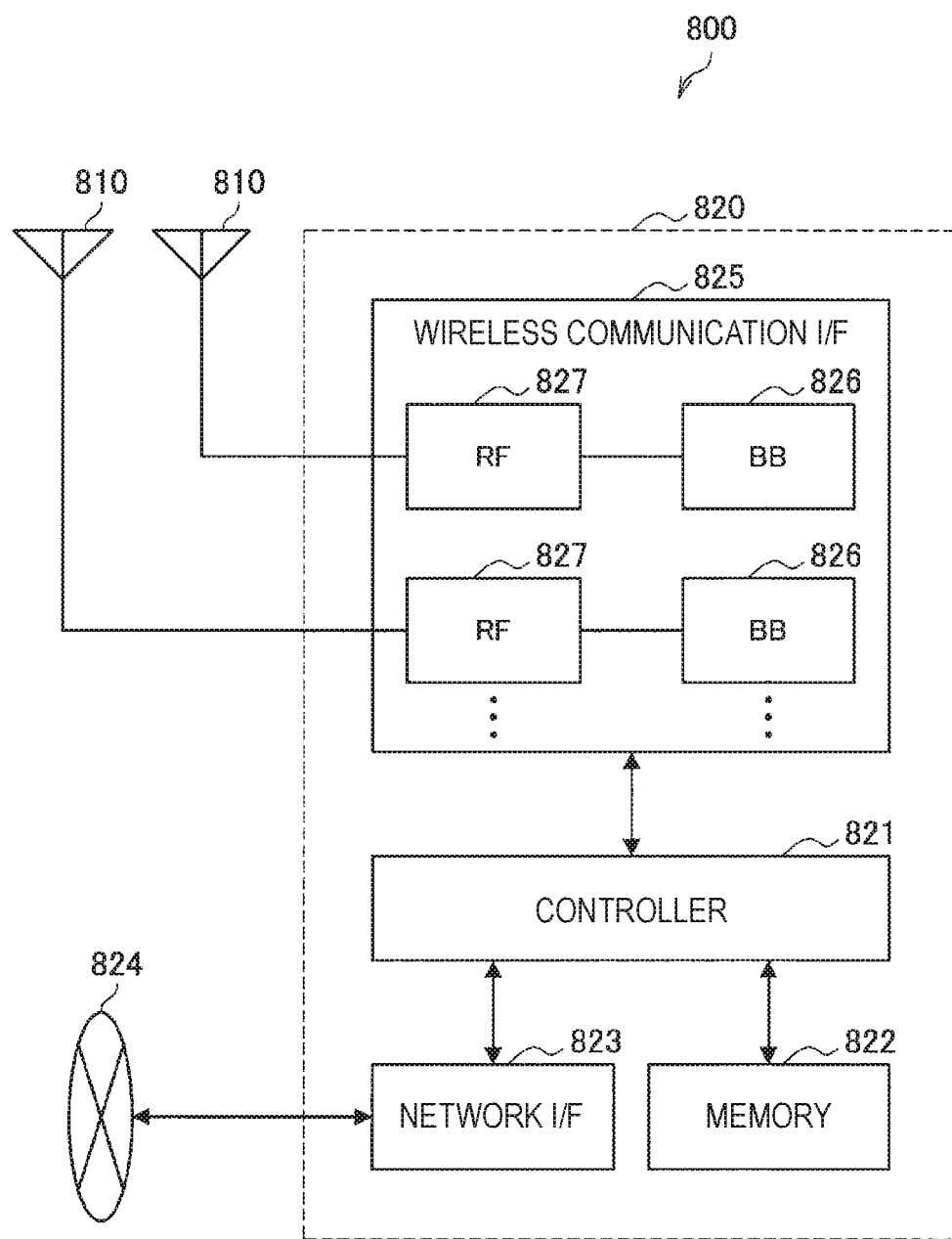
FIG. 24 is a block diagram illustrating a first example of a schematic configuration of an eNB.

FIG. 24 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 80X) may include the plurality of the antennas 810 as illustrated in FIG. 24, and the plurality of antennas 810 may, for example, correspond to a plurality of frequency bands used by the eNB 800. It should be noted that while FIG. 24 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 24, and the plurality of BB processors 826 may, for example, correspond to a plurality of frequency bands used by the eNB 800. Further, the wireless communication interface 825 may also include a plurality of the RF circuits 827, as illustrated in FIG. 24, and the plurality of RF circuits 827 may, for example, correspond to a plurality of antenna elements. Note that FIG. 24 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 24, one or more constituent elements of the higher layer processing unit 101 and the control unit 103 described with reference to FIG. 8 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 80X), and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 24, the receiving unit 105 and the transmitting unit 107 described with reference to FIG. 8 may be implemented in the wireless communication interface 825 (for example, the RF circuit 827). Further, the transceiving antenna 109 may be implemented in the antenna 810. Further, the network communication unit 130 may be implemented in the controller 821 and/or the network interface 823.

Second Application Example

Figure 25:
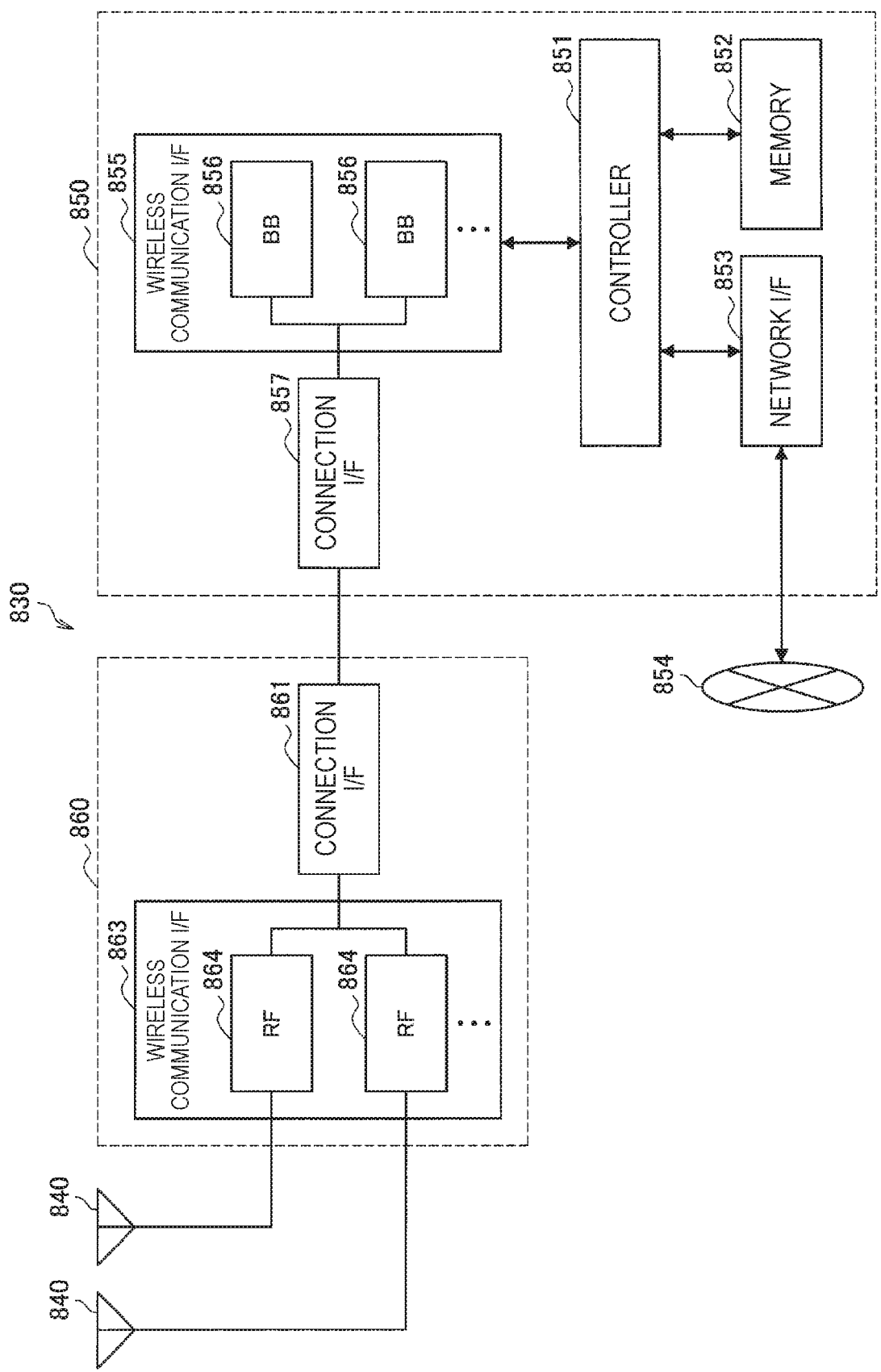
FIG. 25 is a block diagram illustrating a second example of the schematic configuration of the eNB.

FIG. 25 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 25, and the plurality of antennas 840 may, for example, correspond to a plurality of frequency bands used by the eNB 830. Note that FIG. 25 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 24.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 24 except that the BB processor 856 is connected to an RF circuit 864 of the RRH 860 via the connection interface 857. The wireless communication interface 855 may include a plurality of the BB processors 856, as illustrated in FIG. 24, and the plurality of BB processors 856 may, for example, correspond to a plurality of frequency bands used by the eNB 830. Note that FIG. 25 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 25, and the plurality of RF circuits 864 may, for example, correspond to a plurality of antenna elements. Note that FIG. 25 illustrates an example in which the wireless communication interface 863 includes the plurality of RF circuits 864, but the wireless communication interface 863 may include the single RF circuit 864.

In the eNB 830 illustrated in FIG. 25, one or more constituent elements of the higher layer processing unit 101 and the control unit 103 described with reference to FIG. 8 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 25, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840. Further, the network communication unit 130 may be implemented in the controller 851 and/or the network interface 853.

<2.2 Application Examples for Terminal Apparatus>

First Application Example

Figure 26:
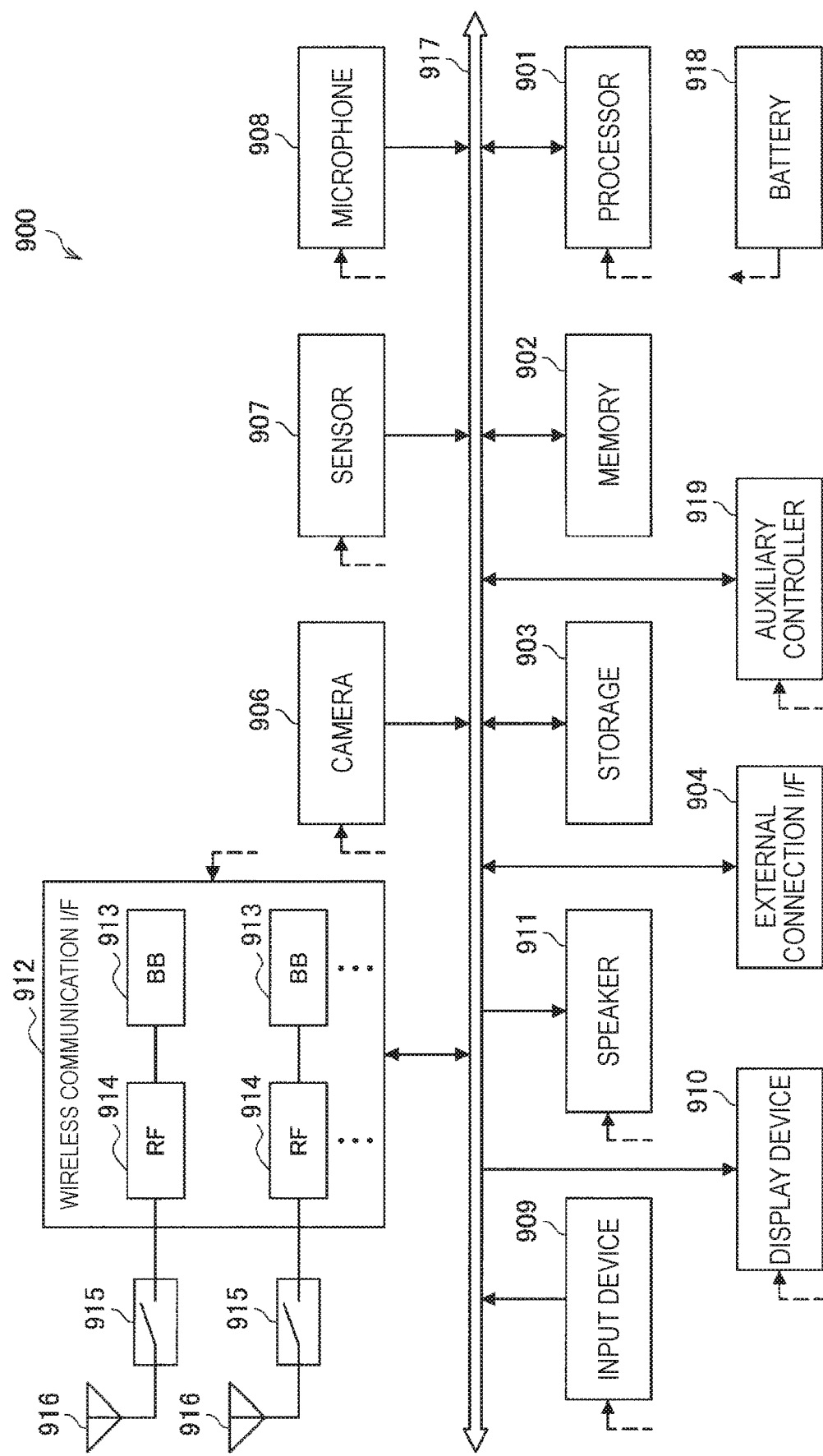
FIG. 26 is a block diagram illustrating an example of a schematic configuration of a smartphone.

FIG. 26 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 26. Note that FIG. 26 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 26. Note that FIG. 26 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other.

The battery 918 supplies electric power to each block of the smartphone 900 illustrated in FIG. 26 via a feeder line that is partially illustrated in the figure as a dashed line. The auxiliary controller 919, for example, operates a minimally necessary function of the smartphone 900 in a sleep mode.

In the smartphone 900 illustrated in FIG. 26, one or more constituent elements of the higher layer processing unit 201 and the control unit 203 described with reference to FIG. 9 described with reference to FIG. 9 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 26, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

Second Application Example

FIG. 27 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 27. Note that FIG. 27 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 27. Note that FIG. 27 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 27 via a feeder line that is partially illustrated in the figure as a dashed line. Further, the battery 938 accumulates the electric power supplied from the vehicle.

In the car navigation 920 illustrated in FIG. 27, one or more constituent elements of the higher layer processing unit 201 and the control unit 203 described with reference to FIG. 9 described with reference to FIG. 9 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In this way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 27, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as a device that includes at least one of the higher layer processing unit 201, the control unit 203, the receiving unit 205, or the transmitting unit 207. The vehicle module 942 generates vehicle data such as vehicle speed, engine speed, and trouble information, and outputs the generated data to the in-vehicle network 941.

3. CONCLUSION

As described above, in the system according to the present embodiment, a communication device (terminal device) selectively switches between a first physical channel and a second physical channel in which both conditions of the number of symbols and the number of resource blocks are different from each other and which are allocated during a predetermined period (for example, one sub frame) in a time direction to transmit control information to a base station.

In this configuration, for example, a configuration of a plurality of uplink control channels designed in accordance with a use case can be multiplexed in a preferred suitable mode. Moreover, transmission efficiency of the entire stem can be further improved.

Further, the communication device according to the present embodiment may multiplex the first physical channel and the second physical channel in the time direction and the frequency direction. In this configuration, in the system according to the present embodiment, communication of different request conditions can be accommodated in one carrier. Therefore, the transmission efficiency of the entire system can be further improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a communication unit configured to perform wireless communication; and a control unit configured to selectively switch between a first physical channel and a second physical channel in which both conditions of the number of symbols and the number of resource blocks are different from each other and which are allocated during a predetermined period in a time series to transmit control information to a base station.

(2)

The communication device according to (1), in which the control unit switches between the first physical channel and the second physical channel on the basis of a timing instructed from the base station.

(3)

The communication device according to (2), in which, in a case in which a timing of self-contained transmission is instructed from the base station, the control unit switches to the physical channel in which the number of symbols is less among the first physical channel and the second physical channel on the basis of the timing.

(4)

The communication device according to (2) or (3), including:

a notification unit configured to notify the base station of information regarding a capability, in which, after the notification of the information regarding the capability, the control unit receives an instruction related to the timing at which the first physical channel and the second physical channel are switched, from the base station.

(5)

The communication device according to any one of (1) to (4), in which the control unit switches between the first physical channel and the second physical channel in accordance with a type of data to be transmitted to the base station.

(6)

The communication device according to any one of (1) to (5), in which the control unit switches the first physical channel and the second physical channel in accordance with a frequency bandwidth for transmitting the control information.

(7)

The communication device according to any one of (1) to (6), in which the control unit switches the first physical channel and the second physical channel in accordance with a calculation value of transmission power for transmitting the control information.

(8)

The communication device according to any one of (1) to (7), in which the control unit switches the first physical channel and the second physical channel in accordance with a communication system applied to communication with the base station.

(9)

The communication device according to any one of (1) to (8), in which the control unit switches the first physical channel and the second physical channel in accordance with a type of wireless access technology set by dual connectivity.

(10)

The communication device according to any one of (1) to (9), in which the control unit multiplexes the first physical channel and the second physical channel in a time direction or a frequency direction during a period including the one or more predetermined periods.

(11)

The communication device according to (10), in which the control unit multiplexes the first physical channel and the second physical channel in the time direction by allocating the first physical channel during a second period located behind a first period in which the second physical channel is allocated, in the time direction among the two or more continuous predetermined periods.

(12)

The communication device according to (10), in which the control unit multiplexes the first physical channel and the second physical channel in the frequency direction by allocating the first physical channel to a side closer to an end in the frequency direction and allocating the second physical channel to a side closer to a center in the frequency direction, in a frequency bandwidth to which the first physical channel and the second physical channel are allocated.

(13)

A communication device including:

a communication unit configured to perform wireless communication; and a notification unit configured to notify a terminal device of information regarding switching between a first physical channel and a second physical channel in which both conditions of the number of symbols and the number of resource blocks are different from each other and which are allocated during a predetermined period in a time series to receive control information from the terminal device.

(14)

The communication device according to (13), including:

a control unit configured to control the allocation of the first physical channel and the second physical channel during the predetermined period.

in which, in the second physical channel, the number of resource blocks is greater and the number of symbols is less than in the first physical channel.

(15)

The communication device according to (14), in which the control unit allocates the second physical channel to a side closer to a rear in a time direction during the predetermined period.

(16)

The communication device according to (15), in which the control unit preferentially allocates an index for mapping the control information to the second physical channel, from the rear side in the time direction during the predetermined period.

(17)

The communication device according to (15) or (16), in which the control unit allocates at least a part of the second physical channel such that the part becomes different from another part in respective positions in the time direction and a frequency direction during the predetermined period.

(18)

The communication device according to any one of (14) to (17), in which the control unit allocates the first physical channel to a side closer to an end in a frequency direction of the frequency bandwidth which is an allocation target of the first physical channel.

(19)

The communication device according to (18), in which the control unit preferentially allocates an index for mapping the control information to the first physical channel from the end side in the frequency direction of the frequency bandwidth.

(20) The communication device according to (18) or (19), in which the control unit allocates at least a part of the first physical channel such that the part becomes different from another part in respective positions in a time direction and the frequency direction during the predetermined period.

(21) The communication device according to (18) or (19), in which the control unit consecutively allocates the first physical channel to one end side in the frequency direction of the frequency bandwidth during the predetermined period.

(22) A communication method including:
performing wireless communication; and
selectively switching between a first physical channel and a second physical channel in which both conditions of the number of symbols and the number of resource blocks are different from each other and which are allocated during a predetermined period in a time series to transmit control information to a base station by a computer.

(23) A communication method including:
performing wireless communication; and
notifying a terminal device of information regarding switching between a first physical channel and a second physical channel in which both conditions of the number of symbols and the number of resource blocks are different from each other and which are allocated during a predetermined period in a time series to receive control information from the terminal device by a computer.

(24) A program causing a computer to:
perform wireless communication; and
selectively switch between a first physical channel and a second physical channel in which both conditions of the number of symbols and the number of resource blocks are different from each other and which are allocated during a predetermined period in a time series to transmit control information to a base station.

(25) A program causing a computer to:
perform wireless communication; and
notify a terminal device of information regarding switching between a first physical channel and a second physical channel in which both conditions of the number of symbols and the number of resource blocks are different from each other and which are allocated during a predetermined period in a time series to receive control information from the terminal device.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 link reference signal generating unit
109 transceiving antenna
130 network communication unit
2 terminal device
201 higher layer processing unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 link reference signal generating unit
209 transceiving antenna

The invention claimed is:

1. A communication device comprising:
communications circuitry configured to perform wireless communication; and
control circuitry configured to selectively switch between a first physical uplink channel and a second physical uplink channel in which both conditions of a number of symbols and a number of resource blocks are different from each other and which are allocated during a predetermined period in a time series to transmit control information to a base station.

2. The communication device according to claim 1, wherein the control circuitry further switches between the first physical uplink channel and the second physical uplink channel on a basis of a timing instructed from the base station.

3. The communication device according to claim 2, wherein, in a case in which a timing of self-contained transmission is instructed from the base station, the control circuitry further switches to one of the first physical uplink channel or the second physical uplink channel in which the number of symbols is less among the first physical uplink channel and the second physical uplink channel on a basis of the timing.

4. The communication device according to claim 2, comprising:
notification circuitry configured to notify the base station of information regarding a capability,
wherein, after the notification of the information regarding the capability, the control circuitry receives an instruction related to the timing at which the first physical uplink channel and the second physical uplink channel are switched, from the base station.

5. The communication device according to claim 1, wherein the control circuitry further switches between the first physical uplink channel and the second physical uplink channel in accordance with a type of data to be transmitted to the base station.

6. The communication device according to claim 1, wherein the control circuitry further switches the first physical uplink channel and the second physical uplink channel in accordance with a frequency bandwidth for transmitting the control information.

7. The communication device according to claim 1, wherein the control circuitry further switches the first physical uplink channel and the second physical uplink channel in accordance with a calculation value of transmission power for transmitting the control information.

8. The communication device according to claim 1, wherein the control circuitry further switches the first physical uplink channel and the second physical uplink channel in accordance with a communication system applied to communication with the base station.

9. The communication device according to claim 1, wherein the control circuitry switches the first physical uplink channel and the second physical uplink channel in accordance with a type of wireless access technology set by dual connectivity.

10. The communication device according to claim 1, wherein the control circuitry multiplexes the first physical uplink channel and the second physical uplink channel in a time direction or a frequency direction during a period including the one or more predetermined periods.

11. The communication device according to claim 10, wherein the control circuitry multiplexes the first physical uplink channel and the second physical uplink channel in the time direction by allocating the first physical uplink channel during a second period located behind a first period in which the second physical uplink channel is allocated, in the time direction among the two or more continuous predetermined periods.

12. The communication device according to claim 10, wherein the control circuitry multiplexes the first physical uplink channel and the second physical uplink channel in the frequency direction by allocating the first physical uplink channel to a frequency closer to an end in the frequency direction than the second physical uplink channel and allocating the second physical uplink channel to a frequency closer to a center in the frequency direction than the first physical uplink channel, in a frequency bandwidth to which the first physical uplink channel and the second physical uplink channel are allocated.

13. A communication device comprising:
communication circuitry configured to perform wireless communication; and
notification circuitry configured to notify a terminal device of information regarding switching between a first physical uplink channel and a second physical uplink channel in which both conditions of a number of symbols and a number of resource blocks are different from each other and which are allocated during a predetermined period in a time series to receive control information from the terminal device.

14. The communication device according to claim 13, comprising:
control circuitry configured to control the allocation of the first physical uplink channel and the second physical uplink channel during the predetermined period,
wherein, in the second physical uplink channel, the number of resource blocks is greater and the number of symbols is less than in the first physical uplink channel.

15. The communication device according to claim 14, wherein the control circuitry allocates the second physical uplink channel to a time slot during the predetermined period earlier than a time slot for the first physical uplink channel.

16. The communication device according to claim 15, wherein the control circuitry preferentially allocates an index for mapping the control information to the second physical uplink channel, in the time direction during the predetermined period.

17. The communication device according to claim 15, wherein the control circuitry allocates at least a part of the second physical uplink channel such that the part becomes different from another part in respective positions in the time direction and a frequency direction during the predetermined period.

18. The communication device according to claim 14, wherein the control circuitry allocates the first physical uplink channel to a frequency closer to an end in a frequency direction of the frequency bandwidth than the second physical uplink channel, so as to correspond to an allocation target of the first physical uplink channel.

19. The communication device according to claim 18, wherein the control circuitry preferentially allocates an index for mapping the control information to the first physical uplink channel from the frequency closer to the end in the frequency direction of the frequency bandwidth.

20. The communication device according to claim 18, wherein the control circuitry allocates at least a part of the first physical uplink channel such that the part becomes different from another part in respective positions in a time direction and the frequency direction during the predetermined period.

21. The communication device according to claim 18, wherein the control circuitry consecutively allocates the first physical uplink channel from the frequency closer to the end in the frequency direction of the frequency bandwidth during the predetermined period.

22. A communication method performed by a communications device, the method comprising:
performing wireless communication; and
selectively switching between a first physical uplink channel and a second physical uplink channel in which both conditions of a number of symbols and a number of resource blocks are different from each other and which are allocated during a predetermined period in a time series to transmit control information to a base station.

23. A communication method performed by a communications device, the method comprising:
performing wireless communication; and
notifying a terminal device of information regarding switching between a first physical uplink channel and a second physical uplink channel in which both conditions of a number of symbols and a number of resource blocks are different from each other and which are allocated during a predetermined period in a time series to receive control information from the terminal device.

24. A non-transitory computer readable product containing instructions for causing a computer to:
perform wireless communication; and
selectively switch between a first physical uplink channel and a second physical uplink channel in which both conditions of a number of symbols and a number of resource blocks are different from each other and which are allocated during a predetermined period in a time series to transmit control information to a base station.

25. A non-transitory computer readable product containing instructions for causing a computer to:
perform wireless communication; and
notify a terminal device of information regarding switching between a first physical uplink channel and a second physical uplink channel in which both conditions of a number of symbols and a number of resource blocks are different from each other and which are allocated during a predetermined period in a time series to receive control information from the terminal device.

\* \* \* \* \*